United States Patent [19]
Fujita

[11] Patent Number: 5,929,585
[45] Date of Patent: Jul. 27, 1999

[54] ROBOT SYSTEM AND ITS CONTROL METHOD

[75] Inventor: Masahiro Fujita, Saitama, Japan

[73] Assignee: Sony Corporation, Tokyo, Japan

[21] Appl. No.: 08/974,562

[22] Filed: Nov. 19, 1997

[30] Foreign Application Priority Data

Nov. 19, 1996 [JP] Japan .................................. 8-323556

[51] Int. Cl.⁶ .................................................. G05B 19/04

[52] U.S. Cl. ................................ 318/568.2; 318/568.12; 318/568.11; 318/569; 901/1; 901/15

[58] Field of Search .......................... 318/568.12, 568.11, 318/568.2, 569; 901/1, 15

[56] References Cited

U.S. PATENT DOCUMENTS

| | | | |
|---|---|---|---|
| 4,651,589 | 3/1987 | Lambert | ................................. 901/15 X |
| 5,355,064 | 10/1994 | Yoshino et al. | ..................... 318/568.12 |
| 5,789,890 | 8/1998 | Genov et al. | ............................ 318/567 |

*Primary Examiner*—Karen Masih
*Attorney, Agent, or Firm*—Frommer Lawrence & Haug, LLP.; William S. Frommer

[57] ABSTRACT

A robot system and its control method making it possible to easily stabilize a working attitude when working with predetermined legs by a simple structure by using a plurality of legs moving while supporting a body. The number of portions requiring position control can be decreased by grounding a predetermined portion not grounded when moving all or some of legs other than predetermined legs used for working and/or a predetermined portion of a body.

14 Claims, 18 Drawing Sheets

ROBOT SYSTEM AND ITS CONTROL METHOD

BACKGROUND OF THE INVENTION

1. Field of the Invention

The present invention relates to a robot system and its control method and is preferably applied to, for example, an automatically-walking system.

2. Description of the Related Art

A conventional automatically-walk robot includes the multiple-leg type by supporting the load of the robot by a plurality of legs. The pantograph type and the so-called joint type constituted by connecting joints by links are considered as leg mechanisms. For example, the case of the "leg mechanism of a walk robot" disclosed in Japanese Patent Publication No. 4-74150, the pantograph type is adopted as a leg mechanism and a mechanical system for efficiently driving the front end of the leg mechanism is described.

The insect-type robot 1 in FIGS. 35A and 35B has six joint-type leg mechanisms 2 to 7.

Each of the leg mechanisms 2 to 7 comprises two leg links 8 and two actuator-provided joints (respectively shown by a hatched circle in FIGS. 35A and 35B) 9. The insect-type robot 1 stands up by driving the horizontal leg mechanisms 2 to 7 by the actuator-provided joints 9 arranged at the roots of the leg mechanisms 2 to 7.

As a walk robot, a type is considered which has an arm not used for walking and works by moving the arm. A human-type robot or a bird-type robot walks with a two-leg mechanism and it is assumed that the robot works by an arm mechanism provided separately from the leg mechanism.

For example, Osuga et al. discuss the control of bending and stretching of knees of a bird-type two-leg robot in "Nonlinear control of two-leg walk robot," Twenty-third Control Theory Symposium, 1994, pp. 313–318. It is assumed that the two-leg walk robot walks with a two-leg mechanism and maintains a standing attitude by the two-leg mechanism when working by using two hands.

However, the two-leg walk robot requires complex control when making the robot only walk with a two-leg mechanism. Therefore, when working by using hands, the two-leg walk robot has a problem that the control for stably keeping a standing attitude is complicated compared to the case of walking.

However, Arai el al. propose a "rim mechanism" constituted by unifying an arm mechanism and a leg mechanism into one body without mounting a manipulator on the leg mechanism in "Study of unification of leg and arm," Eleventh collection of scientific lectures of Robotics of Society of Japan, 1993, pp. 629–630. This robot having a rim mechanism uses his arms also for walking. When the robot works, it performs control so as to stabilize the attitude by keeping the balance with a plurality of leg mechanism links not used for working.

However, to stabilize the attitude by keeping the balance at the time of working, there is a problem that control of leg mechanism links is complicated.

SUMMARY OF THE INVENTION

In view of the foregoing, an object of the present invention is to provide a robot system having a plurality of legs moving while supporting a body and capable of easily stabilizing a working attitude when working with predetermined legs by a simple structure and a method for controlling the robot.

This dog-type robot system includes a shell which is supported by at least four joint-type leg mechanisms serving as legs. The leg mechanisms are connected to the outside front and rear ends of the frame. A neck head mechanism is set on the front frame of the shell. An actuator provided joint is set at the top end of each leg mechanism and is connected to the frame and a further actuator joint is provided at the middle of each mechanism to provide an elbow or knee joint.

In this robot system, the head is provided with a microphone for absorbing external sounds and supplies an output signal to a signal processing circuit. The signal processing circuit supplies angle detection signals of angle detectors arranged on the actuator joints to an analog-to-digital conversion circuit. The analog-to-digital conversion circuit generates angle data corresponding to an angle detection signal and supplies the angle data to a microcomputer serving as control means. Moreover, the signal processing circuit supplies an output signal of the above microphone to the analog-to-digital conversion circuit. The analog-to-digital conversion circuit generates acoustic data corresponding to the intensity of an output signal of the microphone and supplies the acoustic data to the micro computer.

The microcomputer judges the intensity of sound in accordance with acoustic data in the predetermined sampling period and a state of the robot system such as an attitude or action of the robot by comparing the intensity of the sound with a reference value. The microcomputer designates the actuator joints which are control objects corresponding to a determined state and their rotational angles for a pulse generation circuit in accordance with an actuator control valve or angle data previously stored in the memory. The pulse generation circuit generates a control signal corresponding to the designation and supplies the control signal to the actuator joints to be controlled.

Thereby, the robot system can select any one of its attitudes, such as a lying attitude, a sitting attitude, a working attitude, a standing attitude, and types of walking attitude. In this case, the microcomputer selects an attitude or action in accordance with a state machine. The state machine represents an attitude or action of the walk robot and has five states corresponding to the lying attitude, sitting attitude, working attitude, standing attitude and walking attitude. The state machine updates the present state to one of these states in accordance with an external sound. To make the robot execute any attitude or action, the state machine is updated. The microcomputer controls the actuator joints to change attitudes in order to select an attitude corresponding to an updated state.

In the walking attitude, the shell of the robot system is held almost parallel with the horizontal plane (or support surface). In this condition, the controller causes three out of four of the leg mechanisms to move along the support surface in the same direction without causing the remaining leg mechanism to be supported on the support surface. Therefore, the robot can walk by obtaining the horizontal component of the reaction received from the horizontal plane by the supported three leg mechanisms and moving in the same direction as the forward movement of the shell.

The nature, principle and utility of the invention will become more apparent from the following detailed description when read in conjunction with the accompanying description in which like parts are designated by like reference numerals or characters.

DETAILED DESCRIPTION OF THE EMBODIMENT

Figure 1:
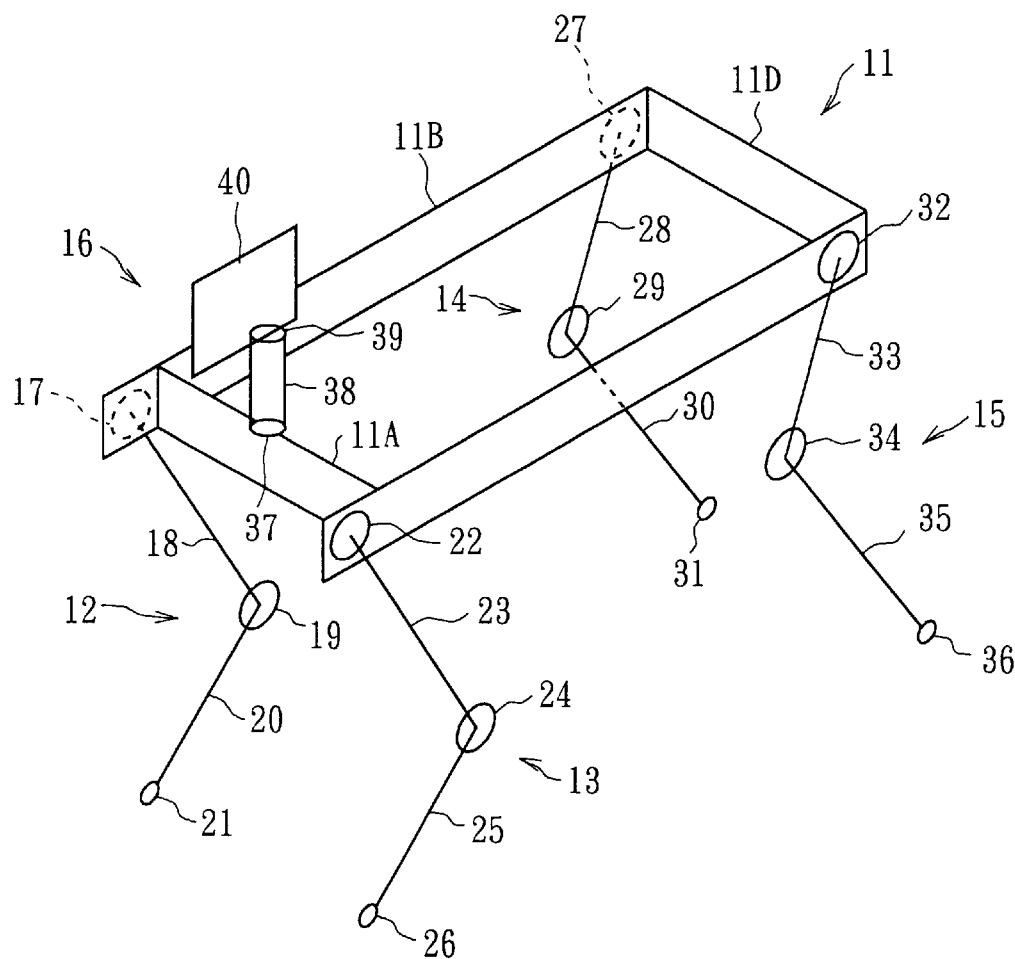
FIG. 1 is a schematic perspective view showing an embodiment of a robot system and its control method of the present invention.

Preferred embodiment of the present invention will be described with reference to the accompanying drawings:

(1) First Embodiment
(1-1) Structure of first embodiment
(1-1-1) General Construction In FIG. 1, 10 generally shows a dog-type walk robot serving as a robot system. A shell 11 constituted with a rectangular rigid body serving as a body is supported by the joint-type leg mechanisms 12 to 15 serving as legs. The shell 11 is constituted by unifying a right frame 11B and left frame 11C arranged in the major-axis direction in parallel and a front frame 11A and rear frame 11D arranged in the minor-axis direction in parallel nearby the front ends and at the rear ends of the right frame 11B and left frame 11C into one body.

The leg mechanisms 12 to 15 are respectively connected to the vicinity of the outside front end of the right frame 11B, the vicinity of the outside front end of the left frame 11C, the vicinity of the outside rear end of the right frame 11B, and the vicinity of the outside rear end of the left frame 11C.

A neck head mechanism 16 is set on the front frame 11A of the shell 11. Moreover, a signal processing circuit (not shown) and a battery serving as a power supply (not shown) are arranged nearby the center of the shell 11.

An actuator-provided joint 17 serving as a joint for generating torque is set to the top end of the right front leg mechanism 12 and the top end is connected to the right frame 11B through the actuator-provided joint 17.

The actuator-provided joint 17 is connected to the top end of a leg link 18, having one degree of freedom for rotating in the plumb plane including the longitudinal direction of the shell 11.

Thereby, the actuator-provided joint 17 can rotate the leg link 18 in the longitudinal direction of the shell 11 at a predetermined angle.

The bottom end of the leg link 18 is connected to an actuator-provided joint 19 serving as a joint for generating torque.

The actuator-provided joint 19 is connected to the top end of a leg link 20, having one degree of freedom for rotating in the plumb plane including the longitudinal direction of the shell 11.

Thereby, the actuator-provided joint 19 can rotate the leg link 20 in the longitudinal direction of the shell 11 at a predetermined angle.

In this connection, in the case of the leg mechanism 12, the actuator-provided joint 17 corresponds to a shoulder joint, the leg link 18 corresponds to an upper arm, the actuator-provided joint 19 corresponds to an elbow joint, the leg link 20 corresponds to a front arm, and a bottom end (shown by an empty circle in FIG. 1) 21 of the leg link 20 corresponds to a hand.

A leg mechanism 13 is constituted the same as the leg mechanism 12 is. In this case, the above leg mechanism 12, actuator-provided joint 17, right frame 11B, leg link 18, actuator-provided joint 19, leg link 20, and bottom end 21 are considered to be equivalent to the leg mechanism 13, actuator-provided joint 22, left frame 11C, leg link 23, actuator-provided joint 24, leg link 25, and bottom end 26 respectively.

The descriptions of leg mechanisms 14 and 15 are omitted because they are constituted almost the same as the leg mechanism 12 is.

In this connection, in the case of the leg mechanisms 14 and 15, the actuator-provided joints 27 and 32 correspond to crotch joints, the leg links 28 and 33 correspond to thighs, the actuator-provided joints 29 and 34 correspond to knee joints, the leg links 30 and 35 correspond to shanks, and the bottom ends 31 and 36 correspond to feet.

An actuator-provided joint 37 is set to the bottom end of the neck head mechanism 16 and the bottom end is connected to the central portion of the front frame 11A through the actuator-provided joint 37. The actuator-provided joint 37 is connected to the bottom end of a neck 38 and rotates in the plumb plane including the longitudinal direction of the shell.

Thereby, the actuator-provided joint 37 can rotate the neck 38 in the vertical direction of the shell 11.

The top end of the neck 38 is connected to a head 40 through an actuator-provided joint 39.

The actuator-provided joint 39 rotates about the top and bottom end directions of the neck 38.

Thereby, the neck head mechanism 16 can rotate the head 40 in the longitudinal direction and the cross direction of the shell 11.

The head 40 is provided with a microphone (not shown) for absorbing external sounds. The microphone supplies an output signal to a signal processing circuit.

The signal processing circuit supplies angle detection signals of angle detectors (not shown) arranged on the actuator-provided joints 17, 19, 22, 24, 27, 29, 32, 34, 37, and 39 to an analog-to-digital conversion circuit (not shown).

The analog-to-digital conversion circuit generates angle data corresponding to an angle detection signal and supplies the angle data to a microcomputer (not shown) serving as control means.

Moreover, the signal processing circuit supplies an output signal of the above microphone to the analog-to-digital conversion circuit.

The analog-to-digital conversion circuit generates acoustic data corresponding to the intensity of an output signal of the microphone and supplies the acoustic data to the microcomputer.

The microcomputer judges the intensity of sound in accordance with acoustic data in the predetermined sampling period and determines a state of the walk robot 10 such as an attitude or action of the robot 10 by comparing the intensity of the sound with a reference value. Then, the microcomputer designates the actuator-provided joints 17, 19, 22, 24, 27, 29, 32, 34, 37, and 39 which are control objects corresponding to a determined state and their rotational angles for a pulse generation circuit (not shown) in accordance with an actuator control value or angle data previously stored in a memory (not shown).

The pulse generation circuit generates a control signal corresponding to the designation and supplies the control signal to the actuator-provided joints 17, 19, 22, 24, 27, 29, 32, 34, 37, and 39 to be controlled.

Figure 2:
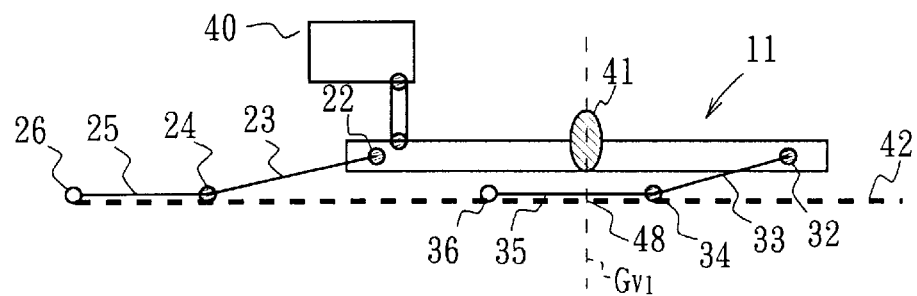
FIG. 2 is a schematic left side view showing a lying attitude of a walk robot.
Figure 3:
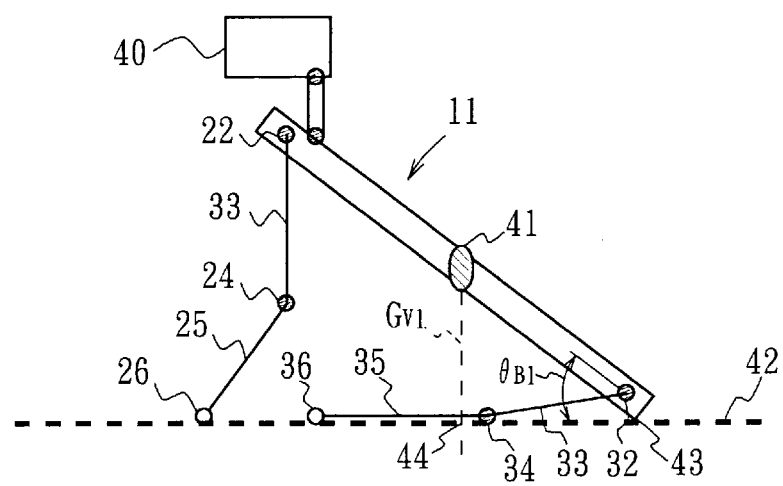
FIG. 3 is a schematic left side view showing a sitting attitude of a walk robot.
Figure 4:
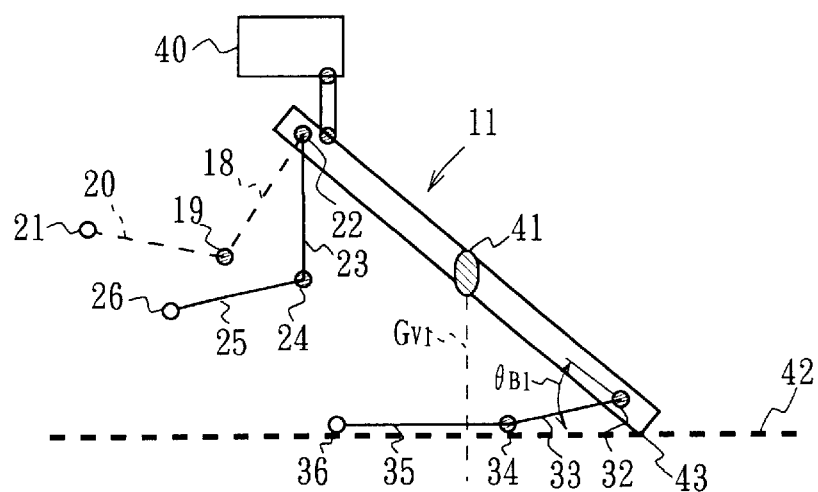
FIG. 4 is a schematic left side view showing a working attitude of a walk robot when working by simultaneously using right-front and left-front leg mechanisms.
Figure 5:
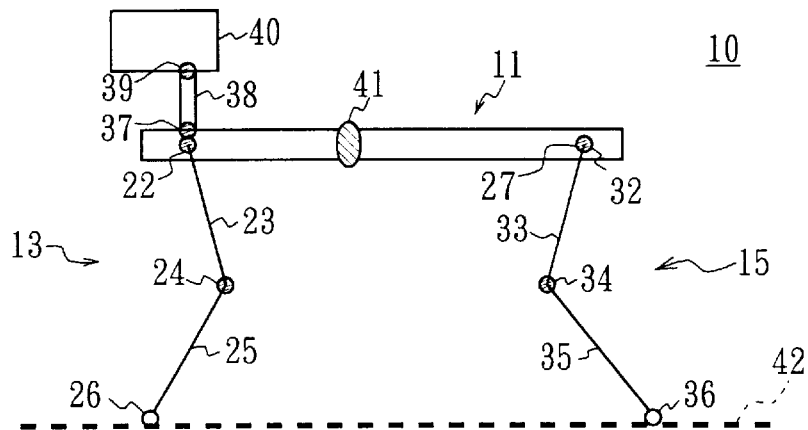
FIG. 5 is a schematic left side view showing a standing attitude of a walk robot.
Figure 6:
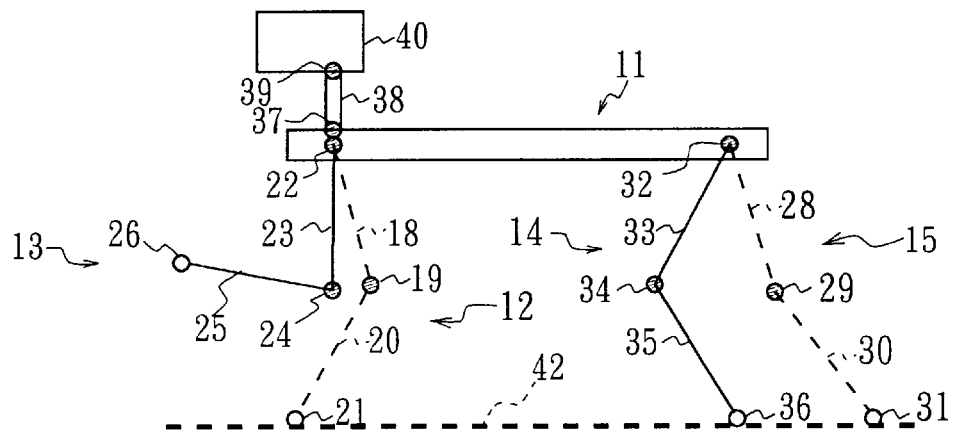
FIGS. 6 to 9 are schematic left side views showing an attitude of a walk robot under walking.
Figure 7:
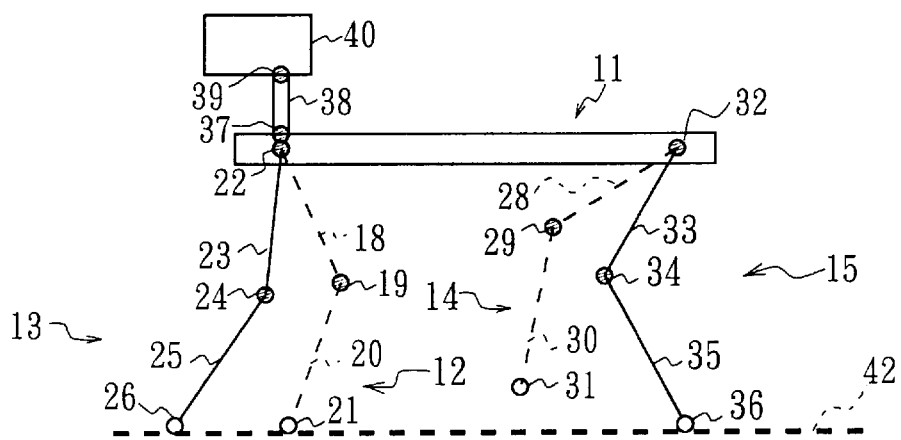
Figure 8:
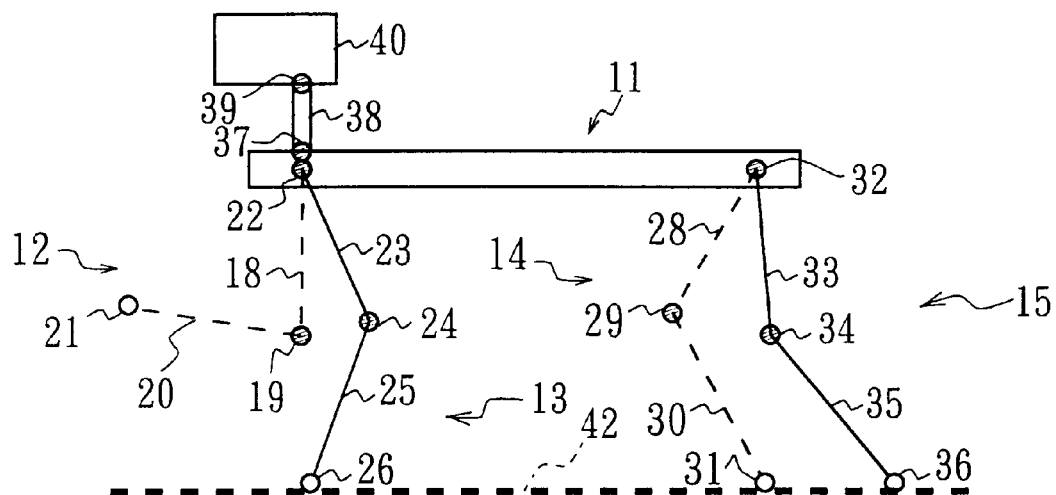
Figure 9:
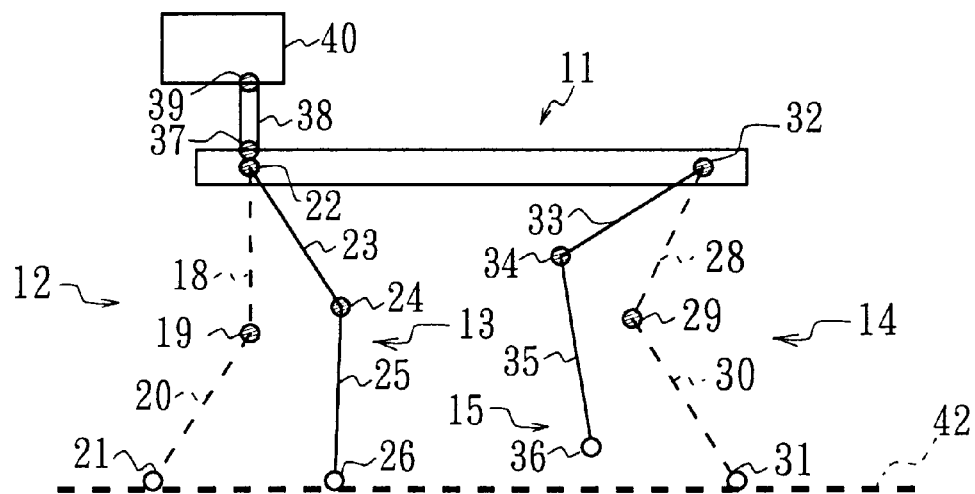

Thereby, the walk robot 10 can select any one of the attitudes or actions such as the lying attitude in FIG. 2, sitting attitude in FIG. 3, working attitude in FIG. 4, standing attitude in FIG. 5, and types of walking in FIGS. 6 to 9.

Figure 10:
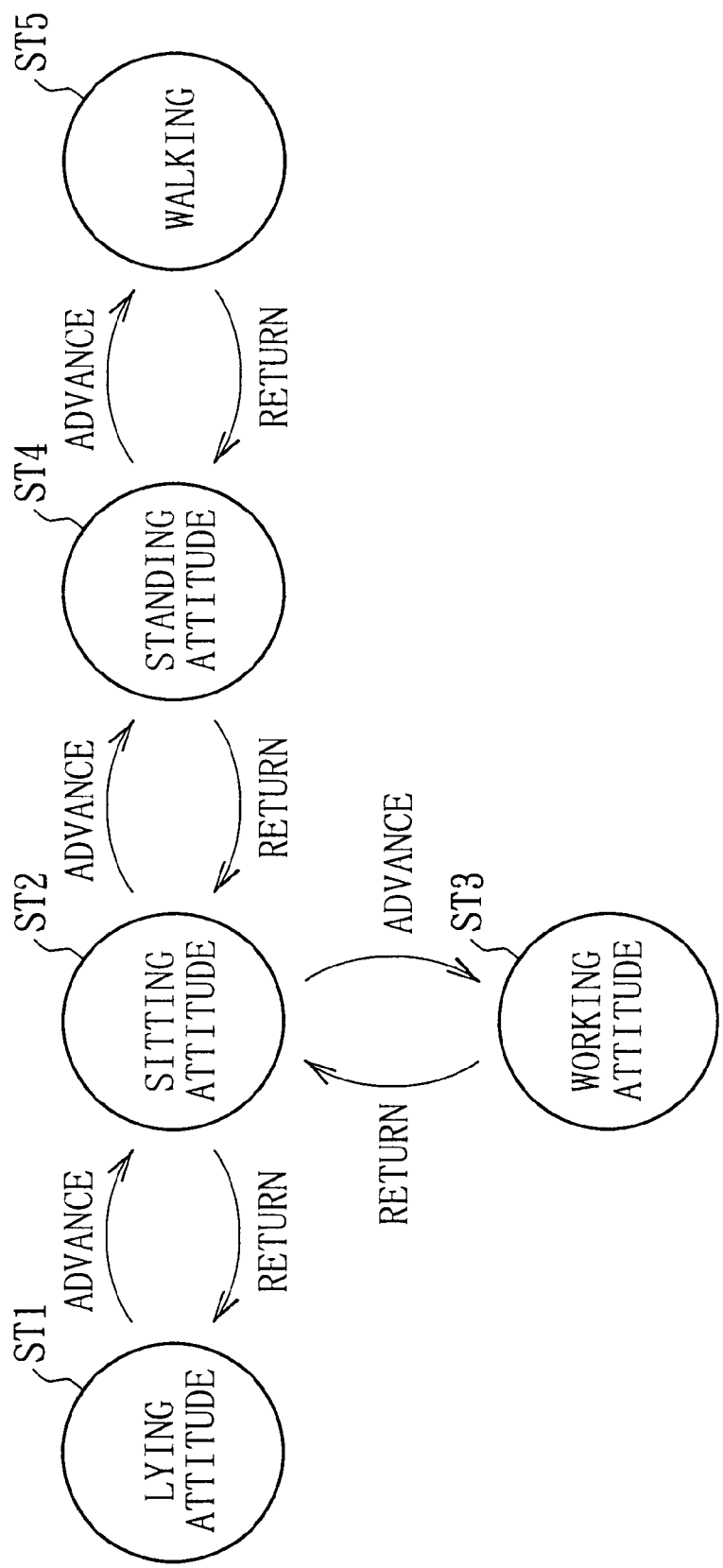
FIG. 10 is a schematic view showing a state machine of a walk robot.

In this case, the microcomputer selects an attitude or action in accordance with a state machine S shown in FIG. 10. The state machine S represents an attitude or action of the walk robot 10 and has five states ST1 to ST5 corresponding to a lying attitude, sitting attitude, working attitude, standing attitude and walking. The state machine S updates the present state to a state in the direction bound for the state ST5 in accordance with the intensity of an external sound (this is hereafter referred to as advance update) or to a state in the direction bound for the state ST1 (this is hereafter referred to as return update).

The advance update updates the present state to the state ST2 (sitting attitude) when the present state is the state ST1 (lying attitude), to the state ST3 (working) or state ST4 (standing attitude) when the present state is the state ST2, and to the state ST5 (walking) when the present state is the state ST4.

However, the advance update selects the state ST5 when the present state is the state ST5. Moreover, the advance update selects the state ST3 when the present state is the state ST3.

The return update updates the present state to the state ST4 (standing attitude) when the present state is the state ST5 (walking), to the state ST2 (sitting attitude) when the present state is the state ST4, to the state ST2 when the present state is the state ST3 (working) and to the state ST1 (lying state) when the present state is the state ST2.

However, the return updates selects the state ST1 when the present state is the state ST1.

To make the walk robot 10 execute any attitude or action, the state of the state machine S is updated. The microcomputer controls the actuator-provided joints 17, 19, 22, 24, 27, 29, 32, 34, 37, and 39 to change attitudes or actions in order to select an attitude or action corresponding to an updated state when the state is updated.

(1-1-2) Steady state in each state

Hereafter, to simplify the subsequent description, it is assumed that the mass is present only in the shell 11 and the head 40 but it is not present in the leg mechanisms 12 to 15 and the neck 38. In this case, as shown in FIGS. 2 and 5, it is assumed that the center of gravity (shown by a hatched ellipse in FIGS. 2 and 5) 41 is present at the center in the longitudinal direction of the shell 11.

As shown in FIG. 2, when the walk robot 10 keeps a lying attitude, it turns all bottom ends 21, 26, 31, and 36 forward and arranges the leg mechanisms 12 to 15 almost horizontally. Thereby, the rears of the right-rear and left-rear leg links 30 and 35 are grounded on a horizontal plane 42 serving as a ground plane nearby the center of gravity 41. Therefore, the ground portions nearby the actuator-provided joints 29 and 34 among the rears of the leg links 30 and 35 respectively support the center of gravity 41 at the right rear and the left rear of a plumb line $G_{V1}$ passing through the center of gravity 41.

Moreover, all the bottom ends 21, 26, 31, and 36 and the leg links 20 and 25 are grounded at the right front and the left front of the plumb line $G_{V1}$ to support the center of gravity 41. Therefore, the walk robot 10 can stably keep a lying attitude.

When the robot 10 keeps a lying attitude, the neck head mechanism 16 turns the longitudinal direction of the head 40 to the horizontal direction and the longitudinal direction of the neck 38 to the plumb direction.

In this connection, the horizontal plane 42 is perpendicular to the gravitational direction.

As shown in FIG. 3, the walk robot 10 keeping a sitting attitude turns the right-front and left-front bottom ends 21 and 26 downward to keep the leg mechanisms 12 and 13 so as to tilt slightly backward from the plumb direction. Moreover, the walk robot 10 turns the right-rear and left-rear bottom ends 31 and 36 forward to arrange the leg mechanisms 14 and 15 almost horizontally.

Thereby, the shell-bottom rearmost portion 43 serving as a non-contact portion separate from the horizontal plane 42 is grounded after the plumb line $G_{V1}$ under walking to support the center of gravity 41. Therefore, the microcomputer does not need to control the support positions at the back of the center of gravity 41.

Moreover, the right-front and left-front bottom ends 21 and 26 are grounded at the right front and the left front of the plumb line $G_{V1}$ to support the center of gravity 41 and thereby, provides a tilt angle $\theta_{B1}$ from the horizontal plane 42 for the shell 11.

Therefore, the microcomputer can stably keep a sitting attitude by controlling only the front-side leg mechanisms 12 and 13.

When a sitting attitude is kept, the neck head mechanism 16 turns the longitudinal direction of the head 40 to the horizontal direction and the longitudinal direction of the neck 38 to the plumb direction.

As shown in FIG. 4, the walk robot 10 keeping a working attitude separates the leg mechanisms 12 and 13 serving as working means under a sitting attitude from the horizontal plane 42. Moreover, the walk robot 10 keeps the tilt angle $\theta_{B1}$ of the shell 11 and holds the rear-side leg mechanisms 14 and 15 almost horizontally.

Thereby, the shell-bottom rearmost portion 43 is grounded after the plumb line $G_{V1}$ to support the center of gravity 41. Therefore, the microcomputer does not need to control the support positions at the back of the center of gravity 41.

Figure 11:
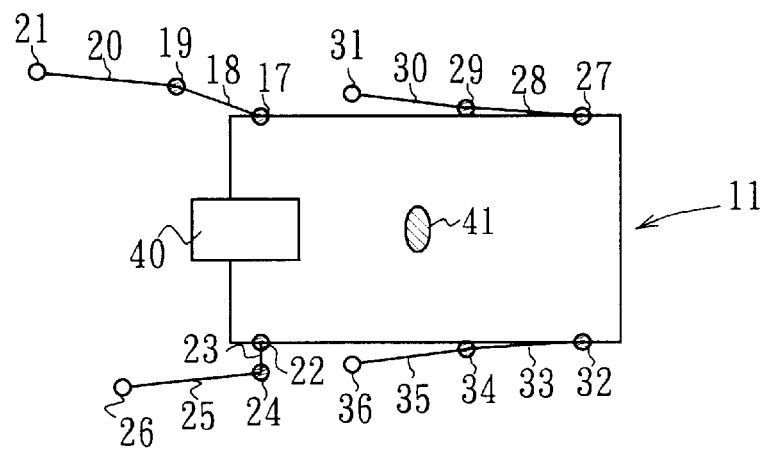
FIG. 11 is a schematic top view showing a working attitude using right-front and left-front leg mechanisms at the same time.

Moreover, as shown by the top view in FIG. 11, the ground portions nearby the bottom ends 31 and 36 out of the rears of the leg links 30 and 35 serving as non-contact portions are respectively grounded at the right front and the left front of the plumb line $G_{V1}$ to support the center of gravity 41 at the front.

Therefore, the walk robot 10 can simultaneously use the leg mechanisms 12 and 13 for any work in the spaces before and under the shell 11 while keeping a working attitude.

Moreover, the microcomputer can easily stabilize a working attitude by controlling only the tilt angle $\theta_{B1}$ by, for example, the rear-side actuators 27 and 32.

As shown in FIG. 5, the walk robot 10 keeping a standing attitude turns all the bottom ends 21, 26, 31, and 36 downward to hold all the leg mechanisms 12 to 15 almost vertically.

Thereby, the right-rear and left-rear bottom ends 31 and 36 are respectively grounded at the right rear and the left rear of the plumb line $G_{V1}$ to support the center of gravity 41.

Moreover, the right-front and left-front bottom ends 21 and 26 are respectively grounded at the right front and the left front of the plumb line $G_{V1}$ to support the center of gravity 41.

Therefore, the walk robot 10 can hold the longitudinal direction of the shell 11 almost in parallel with the horizontal plane 42 and stably keep a standing attitude separating the shell 11 from the horizontal plane 42 by the heights of the leg mechanisms 12 to 15.

As shown in FIGS. 6 to 9, the walk robot 10 when walking holds the longitudinal direction of the shell 11 almost in parallel with the horizontal plane 42. Moreover, the walk robot 10 grounds three out of four leg mechanisms 12 to 15 to move to the same direction such as the backward direction and moreover rotates, for example, forward (in this case, toward the head 40 in the longitudinal direction of the shell 11) without grounding one remaining leg mechanism.

Thereby, the walk robot 10 can walk by obtaining the horizontal component of the reaction received from the horizontal plane 42 by three leg mechanisms grounded and moving in the same direction as a thrust for forward movement of the shell 11.

When walking forward, the walk robot 10 separates the left-front bottom end 26, right-rear bottom end 31, right-front bottom end 21, and left-rear bottom end 36 from the horizontal plane 42 in order. When the robot 10 walks, neither leg links 18, 20, 23, 25, 28, 30, 33, and 35 nor actuator-provided joints 19, 24, 29, and 34 are grounded.

The neck head mechanism 16 turns the longitudinal direction of the head 40 to the horizontal direction and the longitudinal direction of the neck 38 to the plumb direction.

In this connection, in FIGS. 6 to 9, the right leg links 18, 20, 28, and 30 are shown by a broken line respectively. Moreover, the right actuator-provided joints 17 and 27 are not shown because they are located after the shell 11.

(1-1-3) Rising procedure

Figure 12:
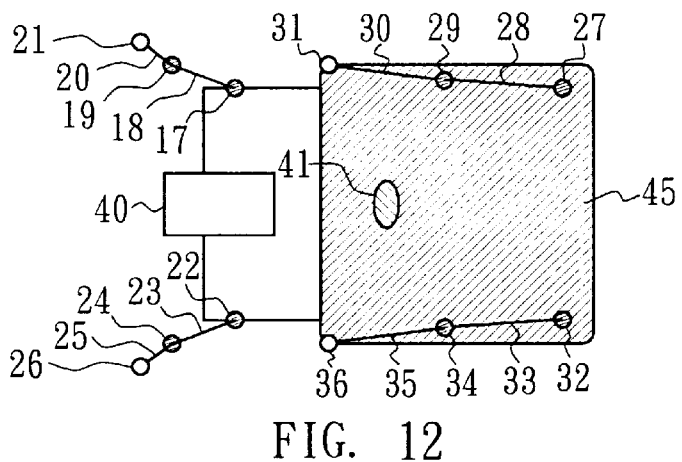
FIG. 12 is a schematic top view showing a support region for a working attitude using right-front and left-front leg mechanisms at the same time.

The walk robot 10 cannot update states from a sitting or working attitude to a standing attitude only by simply rotating the actuator-provided joints 27 and 32. That is, as shown by the top view in FIG. 12, the position of the center of gravity 41 projected on the horizontal plane 42 under a working attitude is kept in a support region 45 formed with a polygon (hatched rectangle in FIG. 12) using the ground points of the right-rear and left-rear bottom ends 31 and 36 and the ground points of the shell-bottom rearmost portion 43 as apexes.

The bottom ends 31 and 36 under the above state support the center of gravity 41 at the front. When operating the bottom ends 31 and 36 by the right-rear and left-rear actuator-provided joints 27 and 32 under the above state, the center of gravity 41 is given a torque in the rear upward direction using the shellbottom rearmost portion 43 as a fulcrum.

Figure 13:
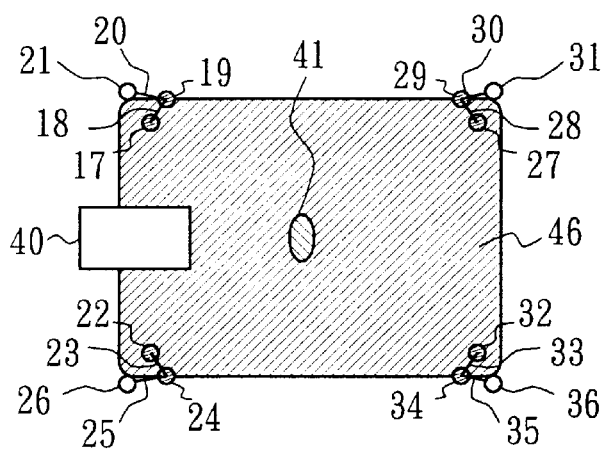
FIG. 13 is a schematic top view showing a support region while a standing attitude is kept.

Moreover, as shown by the top view in FIG. 13, the position of the center of gravity 41 projected on the horizontal plane 42 under a standing attitude is kept in a support region 46 formed with a polygon (hatched rectangle in FIG. 13) formed by using the ground points of all the bottom ends 21, 26, 31, and 36 as apexes.

Figure 14:
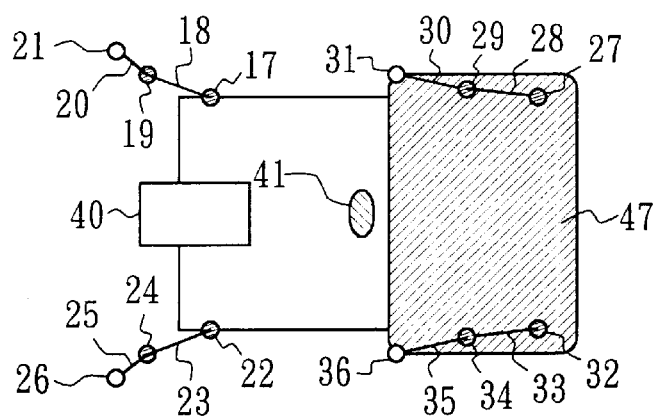
FIG. 14 is a schematic top view showing a support region when raising a shell under a sitting attitude.

Therefore, when updating states from a working attitude to a standing attitude, the walk robot 10 first grounds the right-front and left-front bottom ends 21 and 26 at the right front and the left front of the plumb line $G_{V1}$ respectively to keep the sitting attitude in FIG. 3. Thereafter, as shown in FIG. 14, the walk robot 10 moves the ground points of the right-rear and left-rear bottom ends 31 and 36 to the right rear and the left rear of the plumb line $G_{V1}$ respectively.

Thereby, the walk robot 10 can set the position of the center of gravity 41 projected on the horizontal plane 42 to a position outside of a support region 47 formed with a polygon formed by using the ground points of the bottom ends 31 and 36, and the ground points of the shell-bottom rearmost portion 43 as apexes.

Moreover, the walk robot 10 operates the bottom ends 31 and 36 under the above state to supply a rear upward torque using the right-front and left-front bottom ends 21 and 26 as fulcrums.

Thereby, the walk robot 10 can keep a standing attitude by raising the rear of the shell 11 by the leg mechanisms 14 and 15.

(1-1-4) Conditions of mechanical system necessary for rising

Then, conditions are considered below, which must be satisfied by the mechanical system of the walk robot 10 when raising the shell 11 from a sitting attitude. A mechanical restriction generally occurs in a mechanical system. The mechanical restriction occurs due to such various factors that a potentiometer (not shown) for measuring a rotation angle of an actuator-provided joint rotates by only approx. 180-degree and links mechanically interfere each other.

For example, when the leg links 28 and 33 cannot be rotated upward from a sitting attitude, it is impossible to move the ground points of the bottom ends 31 and 36 to the back of the plumb line $G_{V1}$ because the bottom ends 31 and 36 are restricted by the horizontal plane 42.

In this case, it is shown below that the ground points of the bottom ends 31 and 36 can be moved to the back of the plumb line $G_{V1}$ from a sitting attitude or lying attitude by setting the limits of the length and rotation angle of each leg link so that the limits meet a certain condition even if the above mechanical restriction is present. First, the position of the left-rear leg mechanism 15 when updating states from a lying attitude directly to a standing attitude without passing through a sitting attitude is described below.

However, to simplify the description, the position of the walk robot 10 mainly at the left side is described by assuming that all the leg mechanisms 12 to 15 simultaneously operate symmetrically to the right and left. Moreover, it is assumed that the height of the rotational center of the actuator-provided joint 32 is the same as the height of the bottom of the shell 11.

Figure 15:
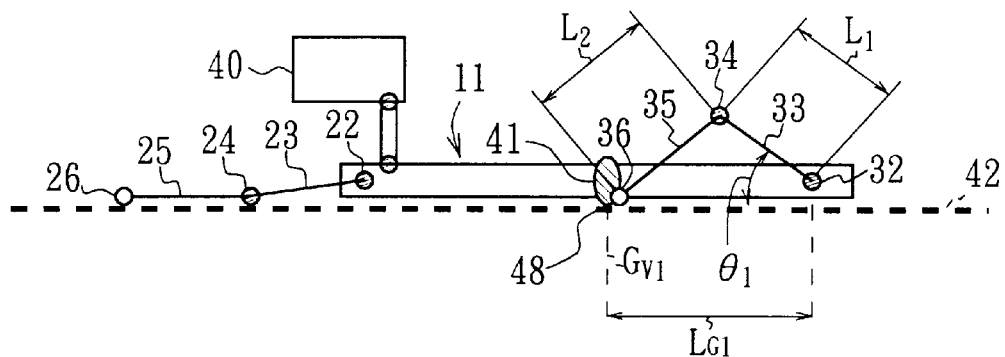
FIG. 15 is a schematic left side view illustrating the position of a rear-side leg mechanism when updating states from a lying attitude directly to a standing attitude.

As shown in FIG. 2, under a lying attitude, the shell 11 is grounded and horizontally held. Moreover, as shown in FIG. 15, a mechanical upward-limit angle $\theta_1$ when rotating the leg link 33 equivalent to a thick crotch upward from the shell 11 is set to the left-rear actuator-provided joint 32. The shell 11 is constituted so that the leg links 33 and 35 can move upward from the shell 11.

When it is assumed that the horizontal length from the actuator-provided joint 32 up to the intersection 48 between the horizontal plane 42 and the plumb line $G_{V1}$ is $L_{G1}$, the length of the leg link 33 is $L_1$, and the length of the leg link 35 equivalent to a shank is $L_2$ and when the ground point of the bottom end 36 is located just at the intersection 48, a triangle is formed which has three sides with the lengths of $L_{G1}$, $L_1$, and $L_2$ and in which the apex angle between the two sides with the lengths of $L_{G1}$ and $L_1$ is equal to the upward-limit angle $\theta_1$. This triangle meets the following equation:

$$L_2^2 = L_1^2 + L_G^2 - 2L_1L_{G1}\cos\theta_1 \qquad (1)$$

Thereby, when the upward-limit angle $\theta_1$ meets the following expression, the bottom end 36 can be grounded (right direction of the paper) after the plumb line $G_{V1}$ without being restricted by the horizontal plane 42.

$$\theta_1 \geq \cos^{-1}\left\{\frac{L_1^2 + L_{G1}^2 - L_2^2}{2L_1L_{G1}}\right\} \qquad (2)$$

Moreover, to ground the bottom end 36 at the front (left direction of the paper) of the plumb line $G_{V1}$ under the working attitude in FIG. 4, it is necessary to meet the following expression:

$$L_1 + L_2 > L_{G1}\cos\theta_{B1} \qquad (3)$$

By setting the lengths $L_1$ and $L_2$, upward-limit angle $\theta_1$, and position of the center of gravity 41 so as to simultaneously meet the expressions (2) and (3), it is possible to ground the bottom end 36 at both the front and back of the center of gravity 41.

Therefore, the walk robot 10 can select a standing attitude directly from a lying attitude.

Figure 16:
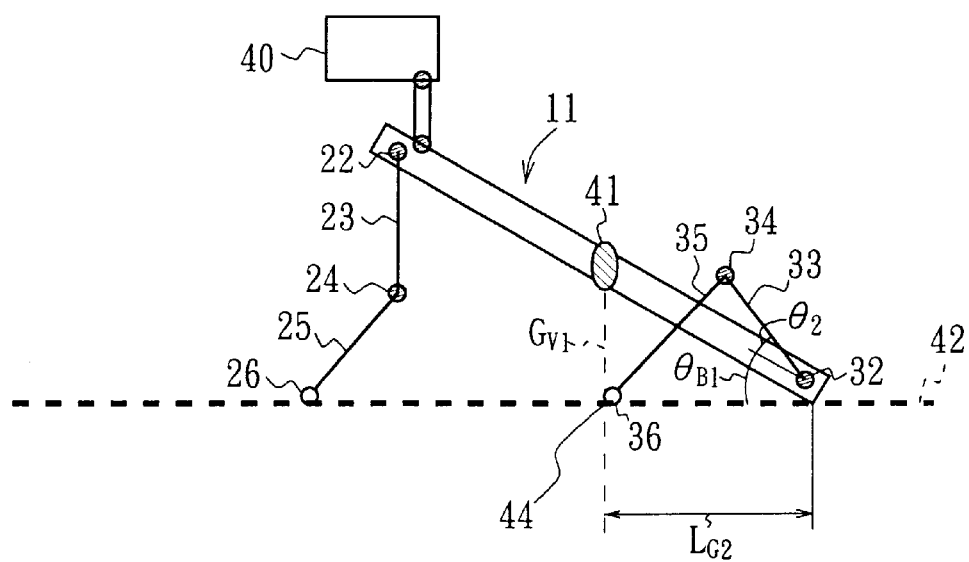
FIG. 16 is a schematic left side view illustrating the position of a rear-side leg mechanism when updating states from a sitting attitude to a standing attitude.

Then, the position of the left-rear leg mechanism 15 when updating states from a sitting attitude to a standing attitude is described below. As shown in FIG. 16, under a sitting attitude, a space corresponding to the tilt angle $\theta_{B1}$ of the shell 11 is formed under the shell 11. Therefore, by using the tilt angle $\theta_{B1}$ and the space, it is possible to easily rotate the actuator-provided joints 32 and 34.

Thereby, it is easy to move the ground point of the bottom end 36 to the back of the intersection 44 between the horizontal plane 42 and the plumb line $G_{V1}$ compared to the case of a lying attitude.

When it is assumed that the mechanical upward-limit angle when rotating the leg link 33 upward from the shell 11 is $\theta_2$ and the horizontal length from the actuator-provided joint 32 up to the intersection 44 is $L_{G2}$ and when the ground point of the bottom end 36 is located just at the intersection 44, a triangle is formed which has three sides with lengths of $L_{G2}$, $L_1$, and $L_2$ and in which the apex angle between the two sides with the lengths of $L_{G2}$ and $L_1$ has an upward-limit angle $\theta_1$ and a tilt angle $\theta_{B1}$.

This triangle meets the following equation:

$$L_2^2 = L_1^2 + L_{G2}^2 - 2L_1L_{G2}\cos(\theta_2 + \theta_{B1}) \qquad (4)$$

Therefore, when the upward-limit angle $\theta_2$ meets the following expression, it is possible to ground the bottom end 36 after the plumb line $G_{V1}$.

$$\theta_2 \geq \cos^{-1}\left\{\frac{L_1^2 + L_{G2}^2 - L_2^2}{2L_1L_{G2}}\right\} - \theta_{B1} \qquad (5)$$

As described above, because the tilt angle $\theta_{B1}$ and the space under the shell 11 can be used, it is possible to set the upward-limit angle $\theta_2$ to a value smaller than the upward-limit angle $\theta_1$.

Thereby, it is possible to moderate the mechanical restrictions of the actuator-provided joints 27 and 32. Moreover, by setting the lengths $L_1$ and $L_2$ and the position of the center of gravity 41 so as to meet the expressions (4) and (5), the walk robot 10 can easily select any one of an attitude for raising the shell 11, working attitude, and standing attitude.

Figure 17A:
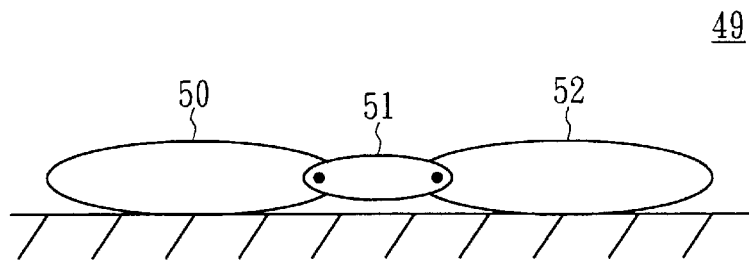
FIGS. 17A to 17C are schematic views showing a robot comprising three links respectively having a curvature.
Figure 17B:
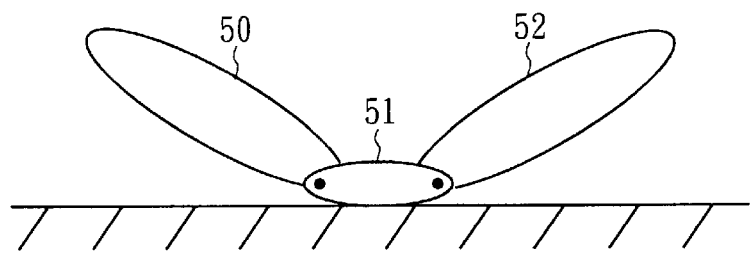
Figure 17C:
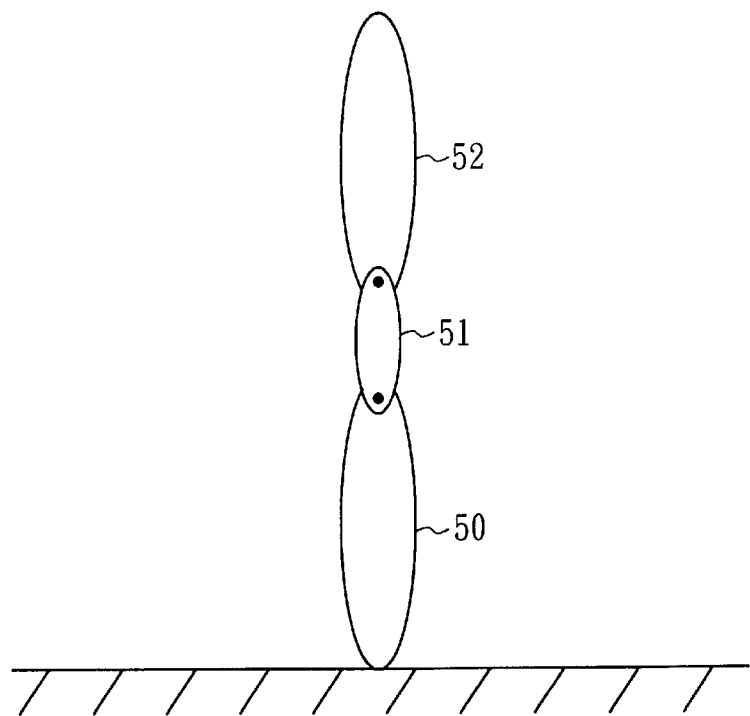

In this connection, as the study on rising of a joint-type robot, there is the collection of theses of Japan Society of Mechanical Engineers (side C), Vol. 58, 555 issue (1992-11) No. 92-0470 "Movement control of robot constituted with three links having curvature." As shown in FIGS. 17A to 17C, a robot 49 of this example comprises only leg mechanisms 50, 51, and 52 and it has a structure different from a two-leg walk robot and a four-leg walk robot which support the shell by a plurality of leg mechanisms.

A conventional two-leg walk robot is made to walk previously from a standing attitude. Therefore, the conventional two-leg walk robot is not controlled so as to stand up.

Omata et al. describe that a robot having a hand, leg mechanism and shell stands by four leg mechanisms from a supine attitude in "Rising operation of hand-leg-shell robot", Robotics mechatronics lecture '95 ROBOMEC '95 lecture thesis collection (Vol. A) pp. 239–242. However, this example describes the plan of a joint torque with restriction when the robot can rise while its hand and leg mechanism are restricted by ground on the basis of the potential method but it does not describe how to ground a hand and a leg mechanism.

The "walking apparatus of robot" in Japanese Patent Laid-Open No. 63-191582 is described in order to raise an overturned robot. In the case of this robot, a driving wheel is provided for the front end of a leg mechanism. The walk robot is characterized in that each leg mechanism is joined with a shell through two rotatable actuators. When the robot overturns, it rises by rotating the leg mechanism by the actuators and moving the driving wheel at the front end of the leg mechanism to a position 180-degree symmetric to the body.

(1-2) Operations of first embodiment

In the case of the above structure, when a sound at a predetermined level is given under a lying attitude, the walk robot 10 first selects a sitting attitude by raising the front of the shell 11 by the right-front and left-front leg mechanisms 12 and 13. When a sound at a predetermined level is given within a predetermined time after selecting a sitting attitude, the walk robot 10 moves the right-rear and left-rear bottom ends 31 and 36 backward and grounds them at the right rear and the left rear of the center of gravity 41 respectively.

Then, the walk robot 10 rotates all the actuator-provided joints 17, 19, 22, 24, 27, 29, 32, and 34 to raise the rear of the shell 11 and selects a standing attitude. When a sound at a predetermined level is given within a predetermined time after selecting the standing attitude, the walk robot 10 starts walking. Moreover, when a sound at a predetermined level is given within a predetermined time after starting walking, the walk robot 10 continues walking.

In this case, when a sound at a predetermined level different from the case of updating a sitting attitude to a standing attitude is given, the walk robot 10 selects a working attitude by separating the right-front and left-front leg mechanisms 12 and 13 from the horizontal plane 42. In this case, the shell-bottom rearmost portion 43 is grounded after the plumb line $G_{V1}$ of the center of gravity 41 to support the center of gravity 41. Moreover, ground portions nearby the bottom ends 31 and 36 among the rears of the leg links 30 and 35 are grounded at the right front and left front of the plumb line $G_{V1}$ to support the center of gravity 41 at the front.

Thereby, the walk robot 10 can further easily stabilize a working attitude even under working by the leg mechanisms 12 and 13 compared to the conventional case.

Then, when a sound at a predetermined level is not given within a predetermined time, the walk robot 10 under walking returns to a lying attitude after selecting a standing attitude and a sitting attitude in order. Similarly, when a sound at a predetermined level is not given within a predetermined time, the walk robot 10 keeping a working attitude returns to a lying attitude after selecting a sitting attitude.

(1-3) Advantages of first embodiment

The above structure makes it possible to ground the shell-bottom rearmost portion 43 not to be grounded for walking and decrease the number of portions requiring position control, control only the tilt angle $\theta_{B1}$ of the shell 11 with the rear-side leg mechanisms 14 and 15 and thereby have four leg mechanisms 12 to 15 walking while supporting the shell 11, and further easily stabilize a working attitude when working with the two front-side leg mechanisms 12 and 13 by a simple structure.

Moreover, it is possible to easily move the rear-side actuators 27, 29, 32, and 34 to positions necessary to raise the shell 11 when a lying, sitting, or working attitude is selected. Therefore, it is possible to easily select a standing attitude when a lying, sitting, or working attitude is kept.

(2) Second Embodiment

Figure 18:
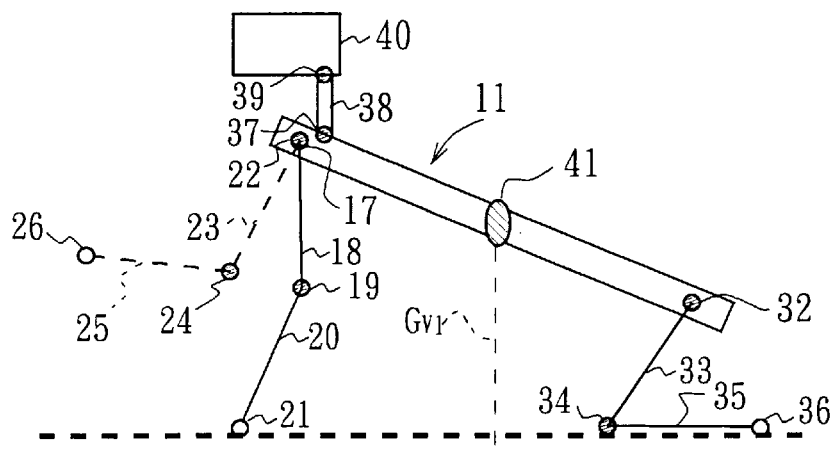
FIG. 18 is a schematic left side view showing a working attitude of the second embodiment.

Then, a working attitude using either of the front-side leg mechanisms 12 and 13 is described below. As shown in FIG. 18, when the walk robot 10 keeps a working attitude using only the right-front leg mechanism 12, it turns the left-front bottom end 26 downward and keeps the left-front leg mechanism 13 so as to tilt slightly backward from the plumb direction. Moreover, the walk robot 10 tilts the right-rear and left-rear leg links 28 and 33 backward from the plumb direction up to a predetermined angle such as 45-degree and grounds the front portions of the leg links 30 and 35 by turning the bottom ends 31 and 36 backward.

Thereby, the ground portions nearby the actuators 29 and 34 among the front portions of the leg links 30 and 35 are grounded at the right rear and the left rear of the plumb line $G_{V1}$ to support the center of gravity 41. Moreover, the left-front bottom end 26 is grounded at the left front of the plumb line $G_{V1}$ to support the center of gravity 41.

Figure 19:
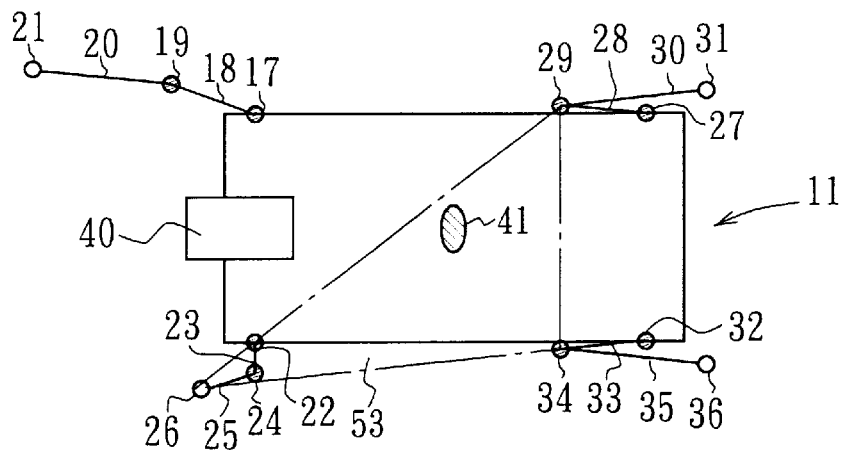
FIG. 19 is a schematic top view showing a support region when the second embodiment keeps a working attitude.

In this case, as shown by the top view in FIG. 19, the position of the center of gravity 41 projected on the horizontal plane 42 is kept in a support region 53 formed with a polygon (triangle shown by an alternate long and short dash line in FIG. 19) formed by using the ground points of the right-rear and left-rear actuators 29 and 34 and the ground point of the left-front bottom end 26 as apexes.

Therefore, the walk robot 10 keeps a working attitude separating only the right-front leg mechanism 12 from the horizontal plane 42 and thus, it is possible to use the leg mechanism 12 for any work in the spaces before and under the shell 11. Moreover, the above working attitude is further stabilized compared to the working attitude in FIG. 4 because the right-front bottom end 21 is grounded adjacently to a work space.

(3) Third Embodiment

Figure 20A:
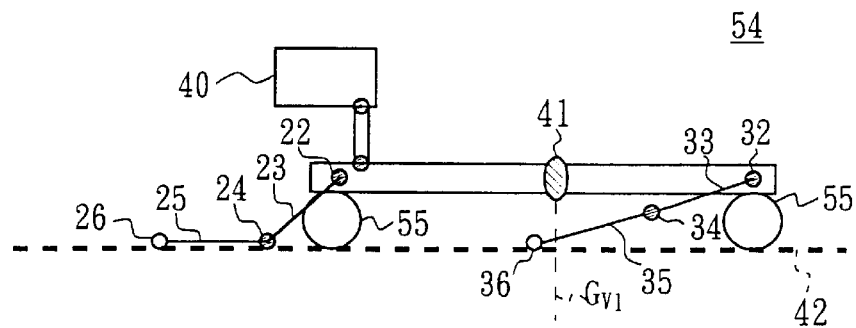
FIGS. 20A to 20C are schematic left side views illustrating the position of a rear-side leg mechanism of the third embodiment when updating states from a lying attitude directly to a standing attitude.
Figure 20B:
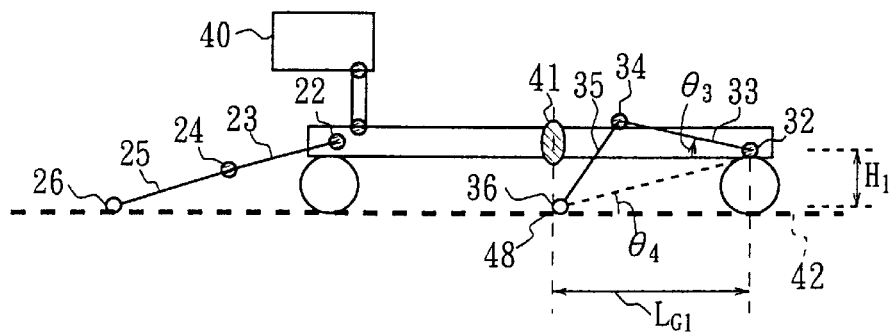
Figure 20C:

As shown in FIGS. 20A to 20C, a walk robot 54 has a round auxiliary leg 55 with a height $H_1$ at the front end and bottom end under the shell 11 in addition to the structure of the walk robot 10.

Thereby, when a lying attitude is kept, the right-rear and left-rear actuators 27 and 32 are separated from the horizontal plane 42 at a height $H_1$. Moreover, the shell 11 is held in parallel with the horizontal plane 42.

In this case, a rectangle is formed by using the rear-side leg links 33 and 35, horizontal plane 42, and height $H_1$ as its sides. When the ground point of the bottom end 36 is located just at the intersection 48, the length $L_{G3}$ between the actuator 32 and the intersection 48 is shown by the following equation:

$$L_{G3} = \sqrt{L_{G1}^2 + H_1^2} \tag{6}$$

Moreover, the angle $\theta_4$ formed between the direction of the length LG3 and the horizontal plane 42 is shown by the following equation:

$$\theta_4 = \tan^{-1} \frac{H_1}{L_{G1}} \qquad (7)$$

Thereby, when the upward-limit angle $\theta_3$ meets the following expression, the bottom end 36 can be grounded after the $G_{V1}$ without being restricted by the horizontal plane 42.

$$\theta_3 \geq \cos^{-1}\left\{\frac{L_1^2 + L_{G3}^2 - L_2^2}{2L_1 L_{G3}}\right\} - \theta_4 \qquad (8)$$

However, when a working attitude is selected, the left-rear bottom end 36 must be grounded before the GV1. Therefore, it is necessary to meet the following equation:

$$(L_1+L_2) \cos \theta_4 > L_{G1} \qquad (9)$$

Moreover, the height $H_1$ must meet the following expression:

$$L_1+L_2 > H_1 \qquad (10)$$

Thus, by separating the right-rear and left-rear actuators 27 and 32 from the horizontal plane 42 by the auxiliary leg 55, a space in which the actuators 30 and 34 rotate is formed under the shell 11.

Thereby, even if the upward-limit angle $\theta_3$ is smaller than the upward-limit angle $\theta_1$ under the lying attitude in FIG. 15, the bottom end 36 can easily move to the back of the $G_{V1}$ by using the space.

(4) Fourth Embodiment

Figure 21A:
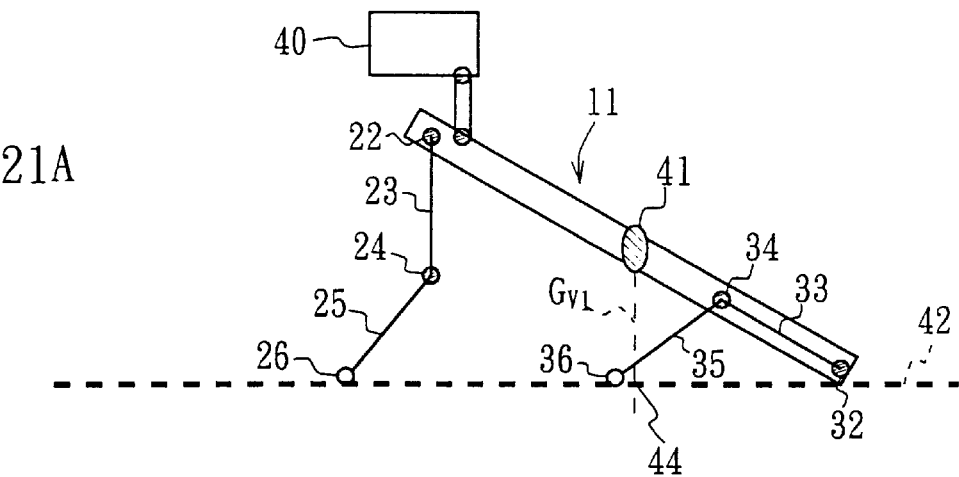
FIGS. 21A and 21B are schematic left side illustrating the movement of the center of gravity of the fourth embodiment when updating states from a sitting attitude to a standing attitude.
Figure 21B:
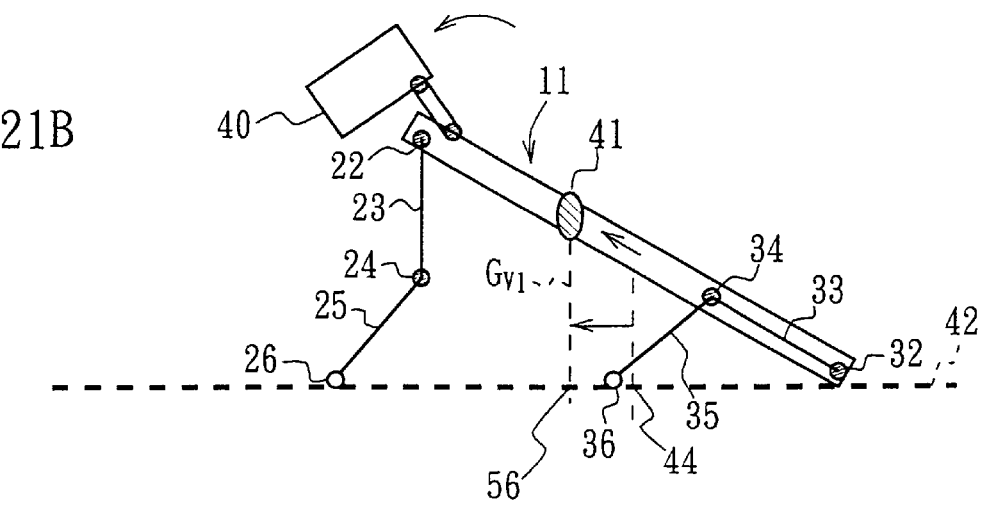

As shown in FIGS. 21A and 21B, a case is assumed in which the left-rear bottom end 36 moved backward is grounded slightly before the $G_{V1}$ when updating a sitting attitude to a standing attitude by rotating the actuator 32 up to a limit angle. In this case, the center of gravity 41 is moved forward by lowering the neck 38 forward by the actuator 37 at the bottom of the neck 38.

Thereby, the positional relation between the plumb line $G_{V1}$ of the center of gravity 41 and the ground point of the bottom end 36 in the longitudinal direction is reversed and the bottom end 36 is grounded after the $G_{V1}$.

Thus, by rotating the actuator 32 up to a limit angle and thereafter moving the center of gravity 41 forward without changing the positional relations between the shell 11 on one hand and the rear-side leg mechanisms 14 and 15 on the other, it is possible to realize a positional relation in which a state can be changed to a standing attitude by raising the shell 11.

(5) Fifth Embodiment

By assuming that the geometric relations between the bottom ends 21, 26, 31, and 36 necessary to raise the shell 11 on one hand and the center of gravity 41 on the other are satisfied and noticing the torque at each of the rear-side actuators 27, 29, 32, and 34 necessary to raise the shell 11, the ground positions of the rear-side bottom ends 31 and 36 are discussed below.

Figure 22:
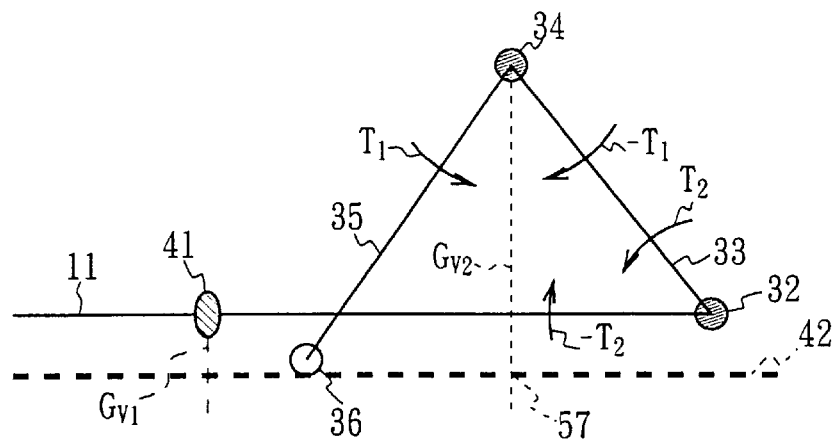
FIGS. 22 and 23 are schematic left side views illustrating the position and torque of a rear-side leg mechanism of the fifth embodiment.

As shown in FIG. 22, when the left-rear bottom end 36 is grounded between the plumb line $G_{V1}$ of the center of gravity 41 and the plumb line $G_{V2}$ of the actuator 34, the actuator 34 provides a counterclockwise torque $T_1$ for the leg link 35 to press the bottom end 36 against the horizontal plane 42.

Thereby, the leg link 33 receives the reaction of the torque $T_1$ and a clockwise torque $-T_1$ about the actuator 34 is given.

The actuator 32 provides a counterclockwise torque $T_2$ for the leg link 33 to raise the shell 11.

Thereby, the reaction of the torque $T_2$ causes the shell 11 to generate a clockwise torque $-T_2$ about the actuator 32.

In the case of this example, when noticing the leg link 33 centering around the actuator 32, it is found that the torques $-T_1$ and $T_2$ work so as to rotate the leg link 33 in the opposite direction respectively.

Therefore, the torque $T_2$ for raising the shell 11 is decreased due to the torque $-T_1$. Thus, it is necessary to increase the torque $T_2$ by the decreased value.

Figure 23:
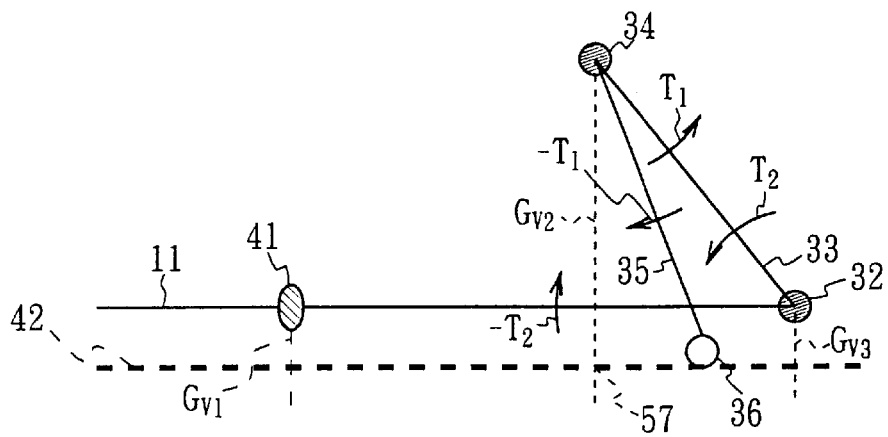

As shown in FIG. 23, however, when the left-rear bottom end 36 is grounded between the $G_{V2}$ and the plumb line $G_{V3}$ of the actuator 34, the actuator 34 provides the clockwise torque $-T_1$ for the leg link 35 to press the bottom end 36 against the horizontal plane 42. In the case of this example, when noticing the leg link 33 centering around the actuator 32, it is found that the torques $T_1$ and $T_2$ work so as to rotate the leg link 33 in the same direction. Thereby, the torque $T_2$ can be small compared to the case of the positional relation in FIG. 22.

Figure 24:
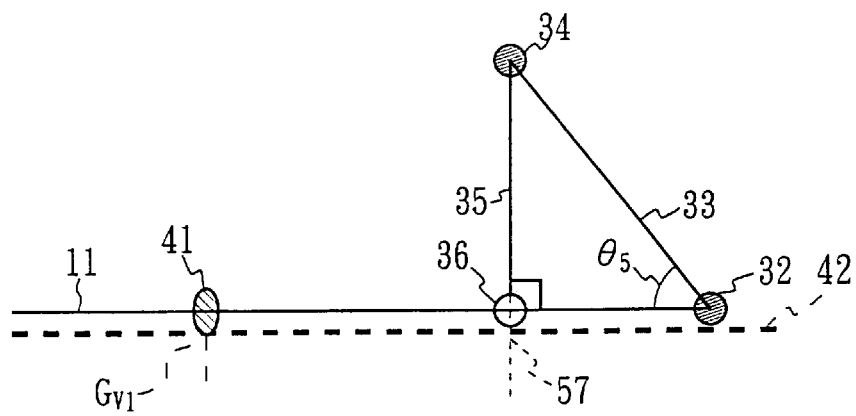
FIGS. 24 to 26 are schematic left side views showing the position of a rear-side leg mechanism of the fifth embodiment when torque states are changed.

To realize the state of the torque in FIG. 23, it is necessary that the bottom end 36 is grounded after the $G_{V2}$ (right side toward the paper) and the $G_{V1}$ is present before the $G_{V2}$. As shown in FIG. 24, to move the ground point of the bottom end 36 from the front side to the rear side of the $G_{V2}$, the ground point of the bottom end 36 must pass through the intersection 57 between the horizontal plane 42 and the $G_{V2}$.

When a lying attitude grounding the shell 11 is kept, the relations between the lengths $L_1$, $L_2$, and $L_{G1}$ when the ground point of the bottom end 36 coincides with the intersection 57 on one hand and the upward-limit angle $\theta_5$ of the leg link 33 from the longitudinal direction of the shell 11 on the other are shown by the following expressions:

$$L_1 \cos \theta_5 \leq L_{G1} \qquad (11)$$

$$L_1 \sin \theta_5 \geq L_2 \qquad (12)$$

By setting the lengths $L_1$, $L_2$, and $L_{G1}$ and the upward-limit angle $\theta_5$ so as to meet the expressions (11) and (12), the walk robot 10 can move the ground point of the bottom end 36 to the rear side of the $G_{V2}$. Moreover, when the lengths $L_1$ and $L_2$ meet the expression (3), the bottom end 36 can be located before the center of gravity and thereby, the walk robot 10 selects a sitting attitude.

Figure 25:
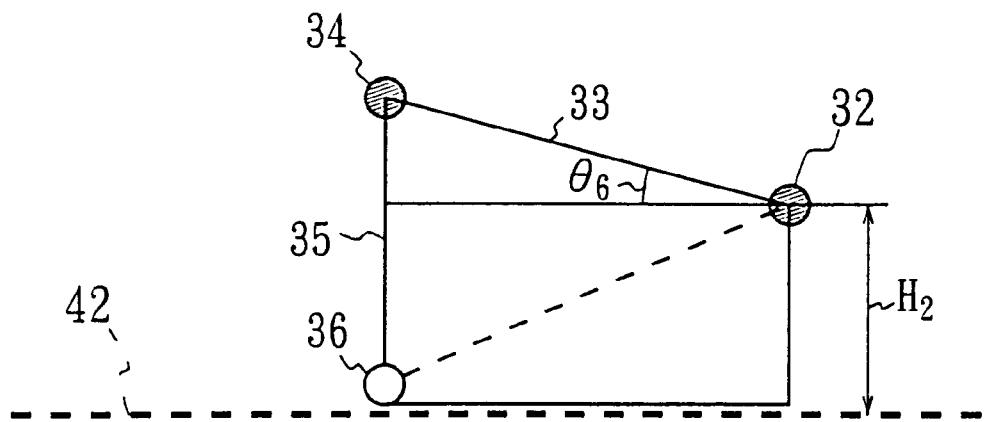

However, as shown in FIG. 25, when a lying attitude is kept in which the shell 11 is horizontally held by the auxiliary leg 55 set to the bottom of the shell 11 and the actuator 32 is lifted from the horizontal plane 42 by a height $H_2$, the relations between the lengths $L_1$, $L_2$, and $L_{G1}$ on one hand and the upward-limit angle $\theta_6$ of the leg link 33 from the longitudinal direction of the shell 11 on the other are shown by the following expressions:

$$L_1 \cos \theta_6 \leq L_{G1} \qquad (13)$$

$$L_1 \sin \theta_6 \geq L_2 - H_2 \qquad (14)$$

$$(L_1+L_2)^2 \geq H_2^2 + L_{G1}^2 \qquad (15)$$

Figure 26:
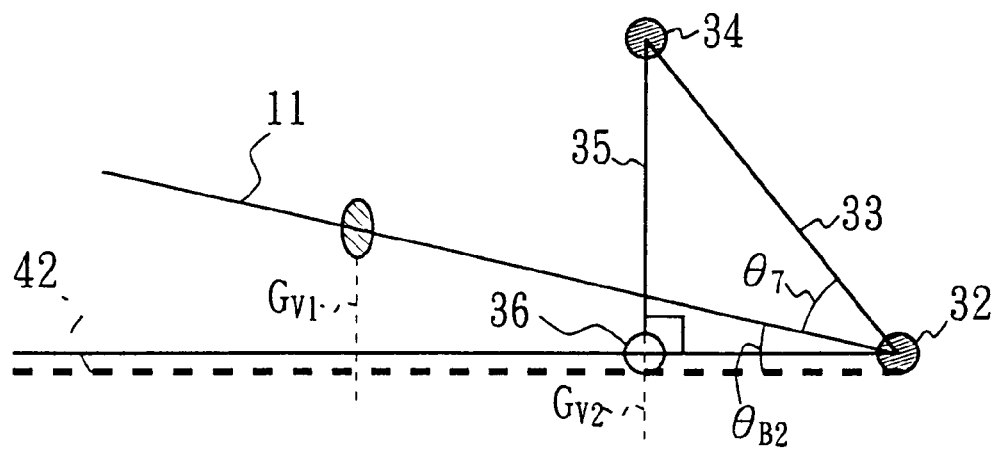

Moreover, as shown in FIG. 26, when the shell 11 has a tilt angle $\theta_{B2}$ from the horizontal plane 42 by raising only the front portion of the shell 11 from a grounded lying attitude, the relations between the lengths $L_1$, $L_2$, and $LG_1$ on one hand and the upward-limit angle $\theta_7$ of the leg link 33 from the longitudinal direction of the shell 11 are shown by the following expressions:

$$L_1 \cos(\theta_7+\theta_{B2}) \leq L_{G1} \cos\theta_{B2} \quad (16)$$

$$L_1 \sin(\theta_7+\theta_{B2}) \geq L_2 \quad (17)$$

$$L_1+L_2 \geq L_{G1} \cos\theta_{B2} \quad (18)$$

Hereafter, a case is assumed in which the ground point of the bottom end 36 cannot be directly moved to the back of the $G_{V2}$ by keeping the shell 11 horizontally. In this case, the walk robot 10 temporarily raises the front portion of the shell 11. Then, the walk robot 10 selects the attitude in FIG. 26 and then, moves the ground point of the bottom end 36 to the back of the $G_{V2}$.

When raising the front portion of the shell 11, the projected position of the center of gravity 41 from the horizontal plane 42 moves backward compared to the case of a lying attitude. Therefore, when raising the shell 11 from the lying attitude, the rear-side actuators 32 and 34 must generate a large torque compared to the front-side actuators 22 and 24. If the rear-side leg mechanisms 14 and 15 are constituted so as to generate a large torque compared to the front-side leg mechanisms 12 and 13, the walk robot 10 can select a standing attitude by raising the shell 11.

Moreover, a case may be better in which the torques generated by all the leg mechanisms 12 to 15 are as uniform as possible. In this case, the walk robot 10 temporarily returns the shell 11 to a horizontal state by lowering the front side of the shell 11.

Thereby, as shown in FIG. 23, the projected position of the center of gravity 41 from the horizontal plane 42 returns forward.

Thereafter, the walk robot 10 selects a standing attitude by raising the shell 11.

This procedure makes it possible to set a mechanical upward-limit angle $\theta_7$ to a value smaller than the upward-limit angle $\theta_5$. Moreover, this procedure makes it possible to improve a torque utilization efficiency by uniformly applying a load to all the leg mechanisms 12 to 15 and raising the shell 11.

(6) Sixth Embodiment

For the above first to fifth embodiments, a case is described in which the leg mechanisms 12 to 15 simultaneously operate symmetrically to the right and left to raise the shell 11. However, a case is described below in which the leg mechanisms 12 to 15 operate asymmetrically to the right and left at different timings to raise the shell 11.

Before raising the shell 11, the walk robot 10 keeps the lying attitude in FIG. 2.

Figure 27:
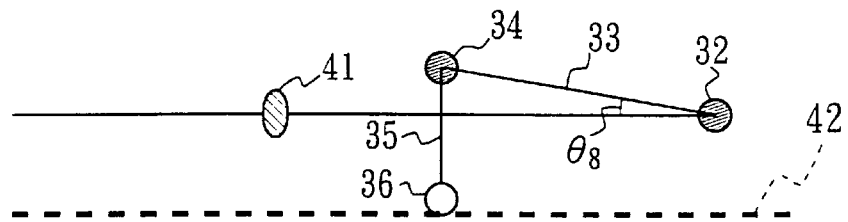
FIGS. 27 and 28 are schematic left side views showing the position of a left-rear leg mechanism when bending only left-side leg mechanisms.

First, as shown in FIG. 27, the walk robot 10 rotates the left-rear leg link 33 up to an upward-limit angle $\theta_8$ to bend the leg mechanism 15 and moreover bend the front-side leg mechanism 13.

Figure 28:
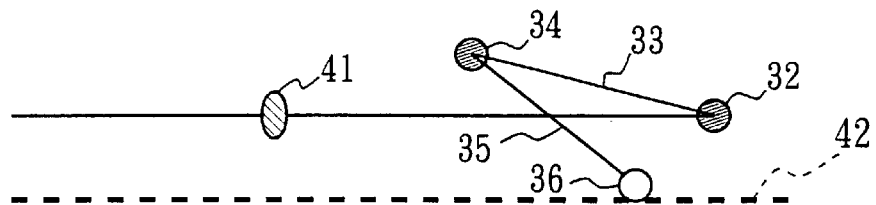

Thereby, as shown in FIG. 28, the walk robot 10 can select a purposed attitude, that is, an attitude immediately before selecting a standing attitude, in which the actuator 34 is located after the center of gravity 41 and the ground point of the bottom end 36 is located after the plumb line $G_{V2}$ of the actuator 34.

Figure 29:
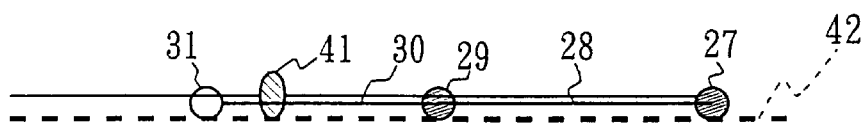
FIG. 29 is a schematic left side view showing the position of a right-rear leg mechanism when bending only left-side leg mechanisms.

Moreover, as shown in FIG. 29, the walk robot 10 keeps the right side of the shell 11 in a lying state.

Figure 30:
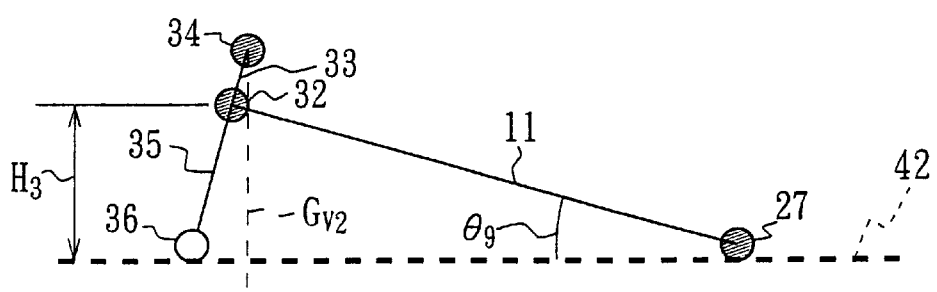
FIG. 30 is a schematic rear view showing the tilt of the shell of the sixth embodiment when bending only left-side leg mechanisms under a lying attitude.

Thereby, as shown by the rear view in FIG. 30, the walk robot 10 can raise only the left side of the shell 11 by keeping the longitudinal direction of the shell 11 horizontally.

In this case, as shown in FIG. 27, when moving the ground point of the bottom end 36 up to a position where the leg link 35 viewed from the lateral perpendicularly intersects the horizontal plane 42, the shell 11 tilts to the right side up to a tilt angle $\theta_9$ from the horizontal plane 42, as shown in FIG. 30. In this case, a height $H_3$ of the actuator 32 can be obtained from the following equation:

$$H_3 = (L_2 - L_1 \sin\theta_8)\cos\theta_9 \quad (19)$$

The height $H_3$ is smaller than a case of simultaneously bending the leg mechanisms 12 to 15 symmetrically to the right and left and raising the shell up to a horizontal state.

Thus, the walk robot 10 selects a purposed attitude according to a two-step operation in which it bends from a lying attitude by shifting the leg mechanisms 12 to 15 asymmetrically to the right and left at different timings. This represents that the walk robot 10 raises the shell 11 up to a height approx. ½ the purposed attitude every one-step operation.

Thereby, the power consumption every one-step operation can be halved compared to the case of selecting the purposed attitude at one time. Therefore, it is possible to effectively use a battery mounted on the walk robot 10.

(7) Seventh Embodiment

Figure 31A:
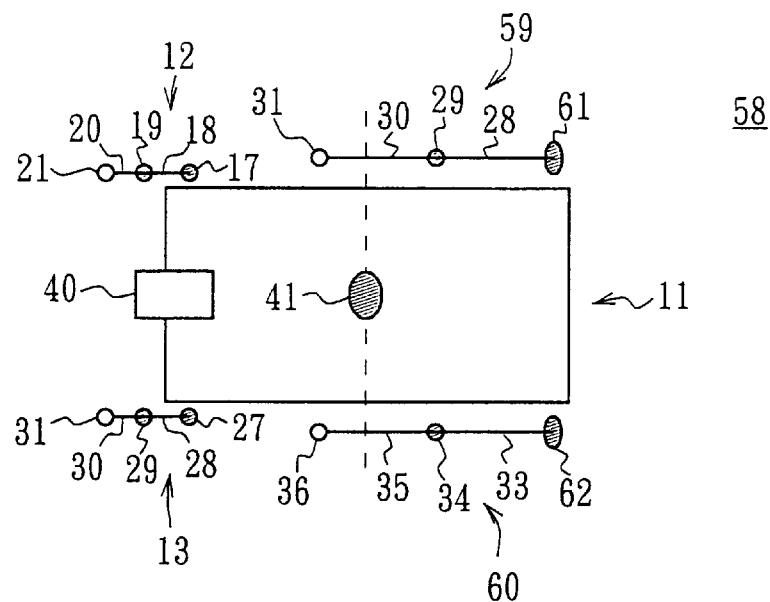
FIGS. 31A and 31B are schematic top views showing the positions of rear-side leg mechanisms of the seventh embodiment.

A case is described below in which a so-called opening degree of freedom for rotating the leg mechanisms 12 to 15 in the cross direction is applied to the leg mechanisms 12 to 15. As shown in FIG. 31A, a walk robot 58 is provided with leg mechanisms 59 and 60 instead of the rear-side leg mechanisms 14 and 15. The top end of the right-rear leg mechanism 59 is provided with an actuator-provided joint 61 instead of the actuator-provided joint 27. The top end of the left-rear leg mechanism 60 is provided with an actuator-provided 62 instead of the actuator-provided joint 32.

The actuator-provided joints 61 and 62 have two degrees of freedom respectively. That is, the right-rear actuator-provided joint 61 rotates in a plumb plane including the longitudinal direction of the shell 11 and moreover rotates the leg link 28 up to an angle of $\theta_{10}$ clockwise. The left-rear actuator-provided joint 62 rotates in a plump plane including the longitudinal direction of the shell 11 and moreover rotates the leg link 33 up to an angle of $\theta_{11}$ counterclockwise.

Figure 31B:
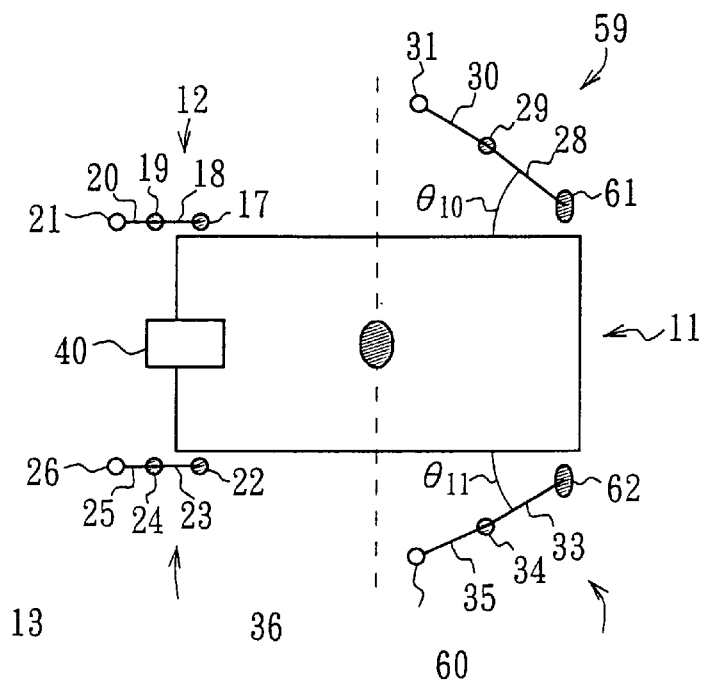

Thereby, as shown in FIG. 31B, when the product between the horizontal component of the length from the actuator-provided joint 61 up to the ground point of the bottom end 31 and $\cos\theta_{10}$ becomes smaller than the longitudinal component of the length from the actuator-provided joint 61 up to the center of gravity 41, the conditions for raising the right side of the shell 11 are satisfied.

Similarly, when the product between the horizontal component of the length from the actuator-provided joint 62 up to the ground point of the bottom end 36 and $\cos\theta_{11}$ becomes smaller than the longitudinal component of the length from the actuator-provided joint 62 up to the center of gravity 41, the conditions for raising the left side of the shell 11 are satisfied.

(8) Eighth Embodiment

For the above embodiments, it has been described to realize positional relations between attitudes and leg mechanisms capable of raising the shell 11 by bending the rear-side leg mechanisms 14 and 15 or the leg mechanisms 59 and 60.

Moreover, methods for realizing positional relations between attitudes and leg mechanisms capable of raising the shell 11 without bending rear-side leg mechanisms are described below.

Figure 32:
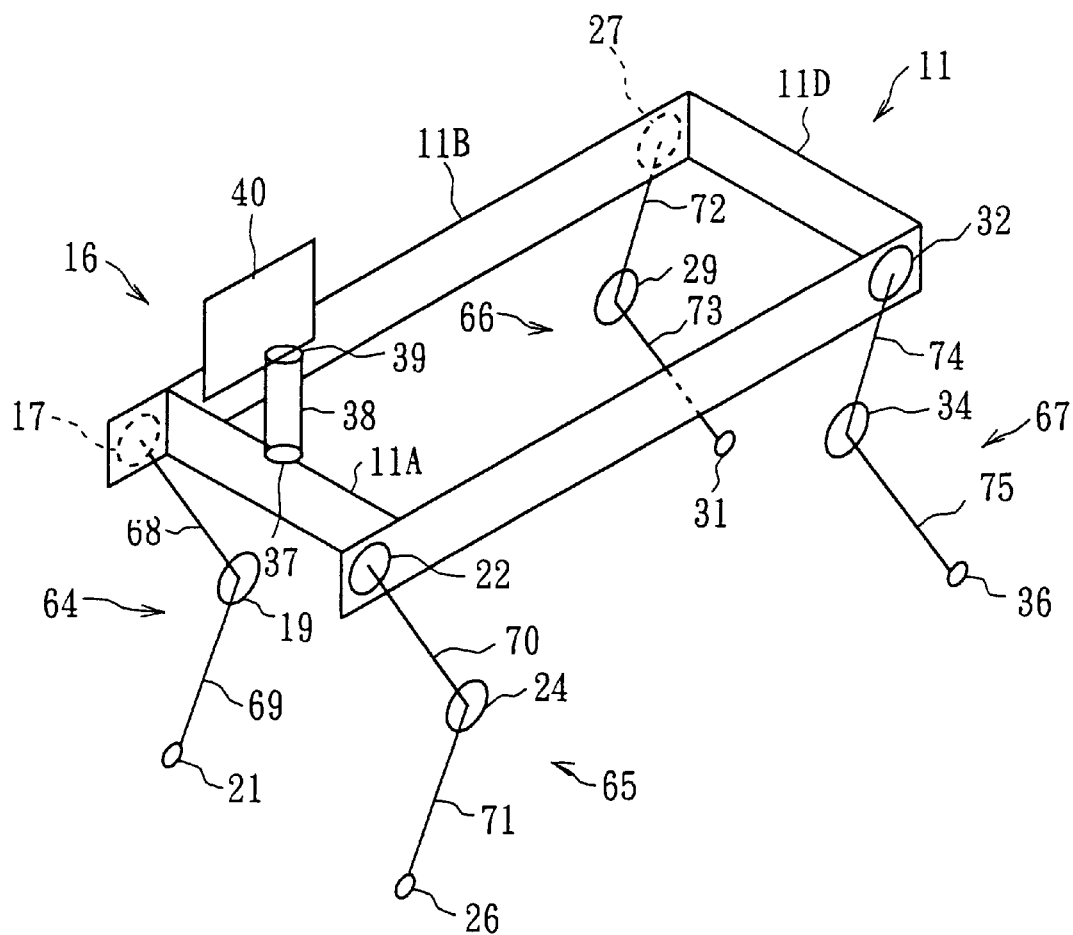
FIG. 32 is a schematic perspective view showing the structure of the walk robot of the eighth embodiment.

As shown in FIG. 32, a walk robot 63 is provided with short leg mechanisms 64 to 67 instead of the leg mechanisms 12 to 15 of the walk robot 10. That is, the right-front leg mechanism 64 is provided with short leg links 68 and 69 instead of the leg links 18 and 20 of the leg mechanism 12. The left-front leg mechanism 65 is provided with short leg links 70 and 71 instead of the leg links 23 and 25 of the leg mechanism 13. The right-rear leg mechanism 66 is provided with short leg links 72 and 73 instead of the leg links 28 and 30 of the leg mechanism 14. The left-rear leg mechanism 67 is provided with short leg links 74 and 75 instead of the leg links 33 and 35 of the leg mechanism 15.

Figure 33:
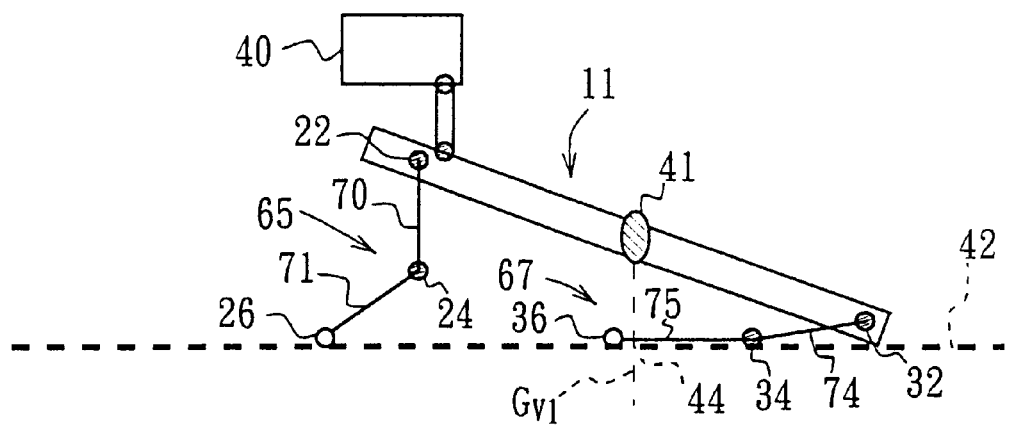
FIG. 33 is a schematic left side view showing the position of a leg mechanism of the eighth embodiment when selecting a sitting attitude.

As shown in FIG. 33, the left-rear bottom end 36 under a sitting attitude is grounded slightly before the intersection 44 between the plumb line $G_{V1}$ of the center of gravity 41 and the horizontal plane 42.

Figure 34:
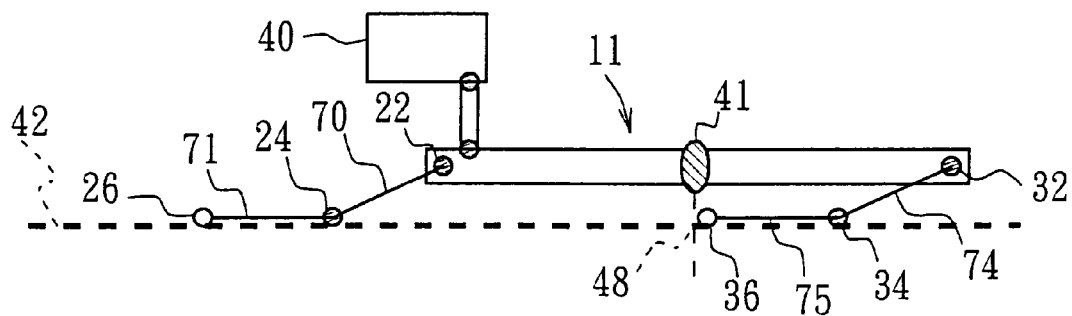
FIG. 34 is a schematic left side view showing the position of a leg mechanism of the eighth embodiment when selecting a lying attitude.
Figure 35A:
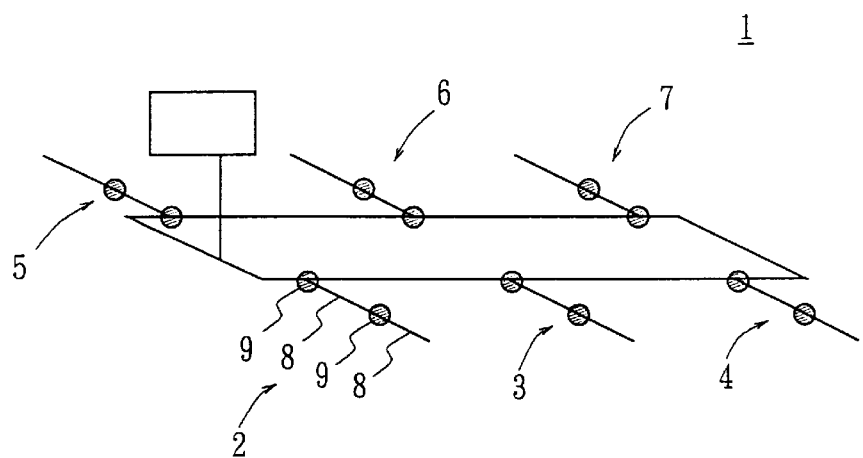
FIGS. 35A and 35B are schematic perspective views illustrating operations of an insect-type robot.
Figure 35B:
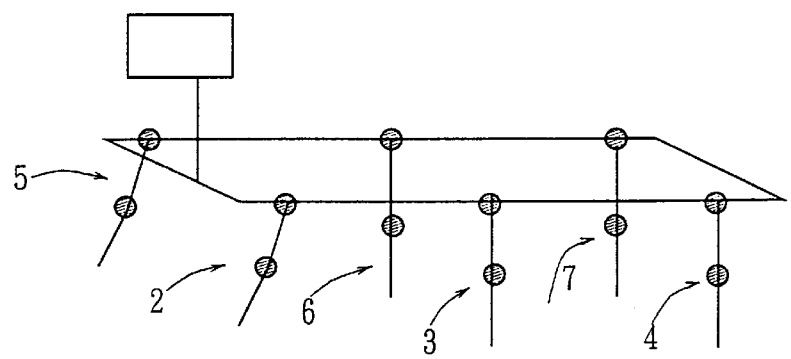

Moreover, as shown in FIG. 34, when the walk robot 63 changes the state from a sitting attitude to a lying attitude, the center of gravity 41 moves forward.

Thereby, the bottom end 36 is grounded after the intersection 48 between the $G_{V1}$ and the horizontal plane 42. Therefore, the walk robot 63 can select an attitude capable of raising the shell 11 by using a rear-side actuator-provided joint.

When considering that the rear-side leg mechanisms 66 and 67 are also bent, the following expression is generally obtained by assuming that the longitudinal minimum length between the rear portion of the shell 11 and the ground point of the bottom end 36 is $L_{MIN}$ and the longitudinal length between the rear portion of the shell 11 and the center of gravity 41 is Lg.

$$L_{MIN} < L_g \quad (20)$$

Moreover, when assuming that the maximum tilt angle of the shell 11 when raising the front portion of the shell 11 by the front leg mechanisms 64 and 65 is $\theta_{MAX}$ and the longitudinal maximum length capable of separating the bottom end 36 from the rear portion of the shell 11 by improving an actuator-provided joint is $L_{MAX}$, the following expression is obtained.

$$Lg \cos \theta_{MAX} < L_{MAX} \quad (21)$$

FIGS. 33 and 34 show examples according to the following equation:

$$L_{MAX} = L_{MIN} = L_1 + L_2 \quad (22)$$

The maximum tilt angle $\theta_{MAX}$ must be larger than the angle formed between the length Lg and the maximum length $L_{MAX}$. Thereby, the following expression is obtained.

$$\theta_{MAX} > \cos^{-1} \frac{L_{MAX}}{Lg} \quad (23)$$

Moreover, the maximum tilt angle $\theta_{MAX}$ is obtained from the following equation by assuming the length of the shell 11 as $L_B$ and the maximum height from the horizontal plane 42 of the front portion of the shell 11 when a sitting attitude is selected as $H_{MAX}$.

$$\theta_{MAX} = \sin^{-1} \frac{L_{MAX}}{L_B} \quad (24)$$

That is, by designing the length $L_B$ and the length of each leg link so as to meet the following expression and changing attitudes, it is possible to longitudinally change the positional relations between the center of gravity 41 and the bottom end 36.

$$\sin^{-1} \frac{H_{MAX}}{L_B} > \cos^{-1} \frac{L_{MAX}}{Lg} \quad (25)$$

(9) Other Embodiments

For the above embodiments, the case has been described in which the present invention is applied to the walk robot 10 walking by four leg mechanisms 12 to 15 connected to the shell 11. However, the present invention is not only limited to the case but also can be widely applied to robot systems moving by supporting a body onto a ground plane by four legs or more connected to the body and making the legs work on the ground plane. Also in this case, the same effects as the above mentioned can be obtained.

Moreover, for the above embodiments, the case has been described in which an actuator-provided joint is set to the top end and the middle of each of the leg mechanisms 12 to 15. However, the present invention is not only limited to the case but also may be applied to a case in which a leg connected to a body has three joints or more.

Furthermore, for the above embodiments, the case has been described in which the rear-side leg mechanisms 14 and 15 are arranged forward almost horizontally under a sitting attitude. However, the present invention is not only limited to the case but also may be applied to a case in which a leg connected to one side of a body is bent and set when an attitude obtained by tilting the body from a ground plane is selected.

Furthermore, for the above embodiments, the case has been described in which an actuator-provided joint has one degree of freedom or two degrees of freedom. However, the present invention is not only limited to the case but also may be applied to a case in which a joint of a leg supporting a body has three degrees of freedom or more.

Furthermore, for the above embodiments, the case has been described in which the shell 11 is supported by the joint-type leg mechanisms 12 to 15 for walking. However, the present invention is not only limited to the case but also may be applied to a case in which a leg moving while supporting a body is optionally constituted into, for example, the pantograph type or jointless type.

Furthermore, for the above embodiments, the case has been described in which the shell 11 is raised by the leg mechanisms 12 to 15. However, the present invention is not only limited to the case but also may be applied to a case in which means for raising a body is used separately from a leg for supporting the body.

Furthermore, for the above embodiments, the case has been described in which the shell-bottom rearmost portion 43 is grounded for working. However, the present invention is not only limited to the case but also may be applied to a case in which a joint or the like of and nearby a body is grounded while a lying attitude is kept, a case in which the front portion of a body made of a rigid body and integrally formed is grounded, a case in which, for example, a rodlike auxiliary leg not used for moving is stored in a body and one end of the auxiliary leg is grounded by lowering the leg onto a ground plane from the body, and a case in which a joint having, for example, one degree of freedom for connecting longitudinally-divided first and second half portions of a body is grounded by bending them downward.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A robot system comprising:
   a plurality of legs respectively connected to a body to support said body;
   means for independently moving each of said legs at a predetermined timing to achieve a predetermined attitude of the robot system selected from the group consisting of a standing attitude, a walking attitude, a sitting attitude, a working attitude, and a lying attitude;
   control means for controlling the predetermined attitude based upon an acoustic data so that the legs can be independently moved into their respective positions to achieve the predetermined attitude of the robot system wherein said control means is capable of moving the robot system into said predetermined attitude with the legs independently moved between positions supported on a support surface and positions not supported on a support surface.

2. The robot system according to claim 1, wherein said control means;
   controls the attitude if the legs to move the legs from a supported position to an unsupported position and provides a plumb line of the center of gravity for a first support region formed by using said supported positions and the supported position of said supported portion in the predetermined attitude as vertexes when performing said work, and
   controls the attitudes of said legs forming said first support region to move the supported positions of said legs and removes said plumb line from a second support region formed by using said supported positions and the supported position of said predetermined portion in the predetermined attitude as vertexes when raising said body from said work.

3. The robot system according to claim 1, wherein said control means:
   controls the attitude of the legs except a first leg to move the supported positions of all or some of said legs and provides a plumb line of the center of gravity for a support region formed by using said supported positions and the supported position of said predetermined portion as vertexes when performing said work, and
   controls the positions of portions of the robot system other than said legs to remove said plumb line from said support region when raising said body from said work.

4. The robot system according to claim 1, wherein said control means:
   controls said legs by staggering the operation sequence of said legs between positioned supported on the support surface and said legs to their predetermined position when the robot system is moved to its working attitude.

5. The robot system according to claim 1, wherein:
   said legs other than said predetermined legs rotate about an axis which is generally perpendicular to the support surface.

6. The robot system according to claim 1, wherein:
   said legs are linkages having a plurality of links and joints for flexibly connecting two of said links corresponding to each other,
   at least one of said links receives a rotation moment from one end thereof and the other end when raising the robot system to its working attitude by said linkages; and
   said control means the positions of said linkages to support the linkage concerned at a position where a rotation moment in the same rotational direction can be supplied to said one end and said other end when raising said body.

7. The robot system according to claim 1, wherein:
   said legs are linkages having a plurality of links and joints for flexibility connecting two of said links corresponding to each other; and
   each of said joints connected to the body has a rotation limit angle which is set so that said joints connected to the joint concerned through said links can be located above said body.

8. The robot system according to claim 2, wherein:
   said control means move said predetermined legs into a support position on a support surface to support said body and thereafter, controls the position of said legs forming said first support region when raising said body.

9. The robot system according to claim 6, wherein;
   said control means tilts said body up to a predetermined angle from a ground plane by said linkages used for said work and thereafter, controls the states of said linkages other than the linkage concerned.

10. The robot system according to claim 6, wherein;
    said control means includes height keeping means which keeps said joints connected to said body at a predetermined height from a ground plane while said body approaches said ground plane.

11. The robot system according to claim 7, wherein;
    said control means tilts said body up to a predetermined angle from a ground plane by said linkages used for said work and thereafter, controls the states of said linkages other than the linkage concerned.

12. The robot system according to claim 7, wherein;
    said control means includes height keeping means which keeps said joints connected to said body at a predetermined height from a ground plane while said body approaches said ground plane.

13. A method for controlling a robot system having a plurality of legs respectively connected to a body to support said body on a support surface comprising the steps of:
    independently moving each of said legs at a predetermined timing to achieve a predetermined attitude of the robot system;
    controlling the attitude based upon acoustic data so that a plumb line of the center of gravity is provided to a first support region formed by using supported positions of the legs and the supported position of a predetermined portion of the robot system as vertexes by supporting said predetermined portion not previously supported for defining movement of selected legs; and
    controlling the supported positions of said legs so that said plumb line is removed from a second support region and said legs are moved to raise said body.

14. A method for controlling a robot system having a plurality of legs respectively connected to a body to support said body on a support surface comprising the steps of:

indepedently moving each of said legs at a predetermined timing to achieve a predetermined attitude of the robot system;

controlling the attitude based upon acoustic data so that a plumb line of the center of gravity is provided to a first support region formed by using supported positions of the legs and the supported position of a predetermined portion of the robot system as vertexes by supporting said predetermined portion not previously supported for defining movement of selected legs; and controlling the positions of portions different from said legs so as to remove said plumb line from said support region to raise said body.

* * * * *